United States Patent
Kwan

(10) Patent No.: US 9,226,232 B2
(45) Date of Patent: Dec. 29, 2015

(54) POWER MANAGEMENT IN A CELLULAR SYSTEM

(71) Applicant: UBIQUISYS LIMITED, Swindon, Wiltshire (GB)

(72) Inventor: Raymond Kwan, Swindon (GB)

(73) Assignee: UBIQUISYS LIMITED, Swindon, Wiltshire (GB)

( * ) Notice: Subject to any disclaimer, the term of this patent is extended or adjusted under 35 U.S.C. 154(b) by 0 days.

(21) Appl. No.: 14/252,405

(22) Filed: Apr. 14, 2014

(65) Prior Publication Data

US 2014/0329534 A1    Nov. 6, 2014

(30) Foreign Application Priority Data

May 2, 2013   (GB) .................................. 1307956.1

(51) Int. Cl.
| | |
|---|---|
| *H04W 72/00* | (2009.01) |
| *H04W 52/02* | (2009.01) |
| *H04W 52/26* | (2009.01) |
| *H04W 52/34* | (2009.01) |
| *H04W 72/04* | (2009.01) |
| *H04W 52/14* | (2009.01) |

(52) U.S. Cl.
CPC ........ *H04W 52/0212* (2013.01); *H04W 52/265* (2013.01); *H04W 52/346* (2013.01); *H04W 72/0473* (2013.01); *H04W 52/143* (2013.01)

(58) Field of Classification Search
CPC . H04W 28/0221; H04W 52/00; H04W 52/16; H04W 52/0212; H04W 52/265; H04W 52/346; H04W 72/0473
USPC .............. 455/13.4, 522, 450, 452.1, 452.2; 370/318, 329, 341
See application file for complete search history.

(56) References Cited

U.S. PATENT DOCUMENTS

| | | | |
|---|---|---|---|
| 2008/0056184 A1* | 3/2008 | Green | 370/329 |
| 2008/0279142 A1 | 11/2008 | Kim et al. | |
| 2013/0114446 A1* | 5/2013 | Liu et al. | 370/252 |
| 2013/0142177 A1* | 6/2013 | Nentwig | 370/336 |
| 2013/0230008 A1* | 9/2013 | Christoffersson et al. | 370/329 |

FOREIGN PATENT DOCUMENTS

| | | |
|---|---|---|
| GB | 2496908 | 5/2013 |
| WO | 2012/139251 | 10/2012 |

OTHER PUBLICATIONS

"The Femto Forum: Interference Management in OFDMA Femtocells", Published by Femto Forum, Mar. 2010. 136 pages.
UKIPO Oct. 28, 2013, Patents Act 1977: Search Report under Section 17, GB Application No. GB1307956.1, 1 page.

(Continued)

*Primary Examiner* — Wayne Cai
(74) *Attorney, Agent, or Firm* — Patent Capital Group

(57) ABSTRACT

There is provided a method for controlling a power allocation in a base station of a cell in a cellular communications network across a plurality of sub-bands. It is determined whether a long-term performance achieved by the cell exceeds a first threshold value and a total transmit power is allocated across the sub-bands according to whether the long-term performance achieved by the cell exceeds the first threshold value. A basestation configured to operate in accordance with the method is also provided.

26 Claims, 22 Drawing Sheets

(56) References Cited

OTHER PUBLICATIONS

"3GPP TS 36.413 V9.5.1 (Jan. 2011) Technical Specification: $3^{rd}$ Generation Partnership Project; Technical Specification Group Radio Access Network; Evolved Universal Terrestrial Radio Access Network (E-UTRAN); S1 Application Protocol (S1AP) Release 9," 3GPP, $3^{rd}$ Generation Partnership Project, Jan. 2011.

De la Roche et al., "Self-Organization for LTE Enterprise Femtocells", Proceedings of IEEE Globecom Workshop, Dec. 2010.

Kwan, R., "Distributed Energy-Saving Mechanism for Self-Organizing Femto LTE Networks", Proceedings IEEE Vehicular Technology Conference (VTC) Fall, Quebec, Canada, Sep. 2012.

Ladanyi, et al., "Distributed Resource Allocation for Femtocell Interference Coordination Via Power Minimisation", Proceedings of IEEE Globecom Workshop, Dec. 2011.

Stolyar, A. L., "Greedy primal-dual algorithm for dynamic resource allocation in complex networks", Queuing System 2006, 54:203-220, Springer, Jul. 24, 2006.

Stolyar, et al., "Self-organizing Dynamic Fractional Frequency Reuse for Best-Effort Traffic Through Distributed Inter-cell Coordination", Proceedings of IEEE Infocomm, Apr. 2009.

* cited by examiner

POWER MANAGEMENT IN A CELLULAR SYSTEM

CLAIM OF PRIORITY

This application claims priority from the patent application filed in the United Kingdom on 2 May 2013, having British Application Serial No. GB1307956.1, entitled "POWER MANAGEMENT IN A CELLULAR SYSTEM," which is hereby incorporated by reference in its entirety.

TECHNICAL FIELD

This disclosure relates to a cellular communications networks, and in particular to methods for controlling a power allocation in a base station of a cell in a cellular communications network across a plurality of sub-bands. The disclosure also relates to base stations in such a network.

BACKGROUND

In cellular communications networks, it is important to improve the throughput that can be achieved by the network. However, it is also important to improve the satisfaction of users of the network by improving the performance that they experience. It is particularly important to improve the performance experienced by user equipments (UEs) at the edge of cells in the network. The reason for this is that UEs close to the centre of cells in the network are generally happy with the performance of the network, and further improvement to the performance experienced by these UEs would proportionally improve their satisfaction. However, it would require more effort to improve the performance experienced by UEs at the edge of cells in the network since these UEs would typically be less happy with the performance of the network. Therefore, a significantly greater overall satisfaction of users in the network could be achieved by improving the satisfaction level of users at the edge of cells in the network.

In addition to improving the satisfaction levels of users of the cellular communications network, it is also important to employ measures for saving energy in the network. If energy is saved in a network, the amount of expenditure and operating costs for the network is reduced and, moreover, the impact on the environment (which has become an increasing concern due to rapidly rising energy consumption) is also reduced.

Further to this, it is also important to ensure that basestations in the cellular communications network are able to communicate with each other effectively. The 3rd Generation Partnership Project (3GPP) provides a means for evolved Node Bs (eNBs) to communicate with each other. However, it is not often practical or the option is not always available in many deployment scenarios for a network to achieve direct communication between two eNBs. For example, this is true of a heterogeneous network (HetNet) in which cells of different sizes, different vendors, or even different technologies are deployed in potentially overlapping regions.

In this type of network, it is possible for a large macro cell to convey information to smaller pico cells for interference purposes. However, it is rarely possible for a small pico cell to convey information to larger macro cells for interference purposes. This results in an asymmetric communication between cells, which makes the effective coordination of interference among cells of different sizes extremely difficult. Moreover, the small cells of the network are randomly deployed, which means that the small cells could reside both in the centre of the macro cell and at the edge of the macro cell. Therefore, signalling for Inter-Cell Interference Coordination (ICIC) purposes over a standard interface through which the basestations are connected (for example, over the X2-interface) requires more refinement due to the non-uniform geometry associated with a HetNet.

Fourth Generation (4G) cellular systems such as Long-Term Evolution (LTE) systems are currently being developed in order to improve both system performance and data rates achieved for UEs compared to that achieved by Third Generation (3G) cellular systems. Although the 4G systems are designed to improve system performance and data rates achieved for UEs, it is also important to improve the performance experienced by UEs at the edge of cells in the network. One of the most effective ways to make such an improvement is via power and interference management.

Generally, power and interference management is designed to improve the overall performance of systems and the performance experienced by UEs by reducing unnecessary interference. The aim of this is to reduce as much power as possible in order to meet a certain satisfaction objective. By eliminating unnecessary transmit power, it is possible to significantly improve the energy efficiency of a network. It is noted that improvement in the energy efficiency of a single base station would not necessarily have a significant impact on the amount of money saved. However, the money saving that is achieved by improving the energy efficiency of basestations in a network having many basestations can be particularly large.

Typically, a cellular communications network comprises more than a single cell, which means that each cell is likely to be surrounded by neighbouring cells. As a UE in the network moves away from the basestation that is currently serving it (the serving basestation) towards a basestation of a neighbouring cell, the call quality experienced by that UE degrades due to a weakening in the quality of the signal received from the serving cell and due to an increase in the interference experienced from the neighbouring cells to which the UE is becoming closer. This type of interference is often referred to as inter-cell interference, and the mitigation of this interference is particularly important to improve the performance experienced by UEs at the edge of cells in the network. It is more complicated to manage interference in LTE systems than it is to manage interference in 3G systems (such as Wideband Code Division Multiple Access (WCDMA) systems) because LTE systems involve power allocation in both the time and the frequency domain whereas 3G systems only involve power allocation in the time domain.

An existing method for the mitigation of inter-cell interference in a cellular communications network is based on Fractional Frequency Reuse (FFR) in which UEs in the centre of each cell of the network are allocated the same frequency, whereas UEs at the edge of cells are allocated with a subset of frequencies that are different from those of the immediate neighbour cell. As a result, the inter-cell interference experienced by UEs at the edge of cells is reduced significantly.

However, this existing method for the mitigation of inter-cell interference suffers from many drawbacks. In particular, it is necessary to carefully plan the subset of frequencies used for the UEs at the edge of cells in the network that can be a complex and time consuming process. Typically, the subset of frequencies is allocated statically during the network planning stage. This method is especially not suitable for femtocells in which basestations are deployed in an ad hoc manner. Furthermore, this method does not take into account the dynamic distributions of traffic in the network, which can result in the spectrum of frequencies being underutilized.

An alternative method for the allocation of power and frequency resources allocates frequency, power, modulation, and coding schemes (MCS) jointly for each UE in a cell in a centralized way. However, this type of approach requires a centralized entity, and the computation complexity is impractically high.

The published paper entitled "*Self-organizing Dynamic Fractional Frequency Reuse for Best-Effort Traffic Through Distributed Inter-cell Coordination*", by A. L. Stolyar, and H. Viswanathan, in proceedings IEEE Infocomm, April 2009, discloses an existing algorithm for self-optimization of a network that aims to improve the overall capacity and/or cell edge data rates. The algorithm is gradient-based in that frequency reuse patterns are dynamically adapted based on the traffic distribution. As this approach is self-organizing among cells in a distributive manner, the time-consuming process of frequency planning is not required. Furthermore, this method not only provides a way to assign frequency in a distributive manner, it also allows the power to be adjusted dynamically in frequency, and thereby provides an extra degree of flexibility. The method allows eNBs to continuously and autonomously adjust their power based solely on standard UE feedbacks.

However, while this existing approach is useful, it does not take into account the Quality of Service (QoS) experienced by UEs. As a result, the power allocation may not necessarily be tailored to the requirements of UEs and, as a result, the power efficiency in the network may be reduced. Moreover, the information exchange required in this existing algorithm is not readily supported by the standard X2-interface. In addition, this approach does not take into account the concept of energy saving, and the power allocation may not be optimal.

Other existing algorithms have been known to take into account QoS requirements directly in power adjustment, provide a simpler message exchange among eNBs, and have been made compatible with the X2 interface. Such an algorithm is disclosed in the published paper entitled "*Distributed Energy-Saving Mechanism for Self-Organizing Femto LTE Networks*", by R. Kwan, in proceedings IEEE Vehicular Technology Conference (VTC) Fall, Quebec, Canada 2012. This existing algorithm suggests that it is possible to achieve significant power saving if the minimal amount of power suitable to meet the QoS requirements is allocated to basestations of the network. Of course, energy saving is only possible if the QoS requirement is not too high for the capacity of the system. The important aspect of this algorithm is that it is possible to maintain suitable performance levels for UEs at the edge of cells in the network while simultaneously providing a suitable level of power saving.

The algorithms discussed above each require some level of communication among eNBs. However, there exist situations where the X2-interface will not always be available. One example is in a heterogeneous network (HetNet), where femto-cells, small cells, and macro cells co-exist. In a HetNet, direct communication between cells may not easily be achievable (for example, since HetNets include cells that would operate under different protocols). Another example is in the case of inter-vendor femto cell deployment. In this situation, it is not clear whether a standard X2-interface exists between femto cells belonging to different vendors. Even if a standard X2-interface did exist, there is no guarantee that each femto cell would react appropriately according to the expectation of another.

There is thus a need for an autonomous algorithm that does not require the use of a standard X2-interface. There are algorithms that already exist that make this possible. However, these existing algorithms require certain sub-band specific feedback from UEs in the network, which is not compatible with 3GPP.

The present disclosure refines the existing algorithms discussed above to take into account the notion of energy saving. In particular, the present disclosure takes into account a factor relating to the happiness of the users of the network to continually adjust the power with the aim of saving energy. The disclosure particularly concentrates on the benefits that can be achieved at the edge of cells in the network while providing continuous refinement of power with the aim of reducing power consumption in the network.

Furthermore, the present disclosure improves the performance experienced by UEs at the edge of cells in the network (thereby increasing the range of the cells) while eliminating unnecessary power consumption (through energy saving) in an autonomous fashion without any need for explicit communications with neighbouring cells. This eliminates the need to establish communication links among neighbour cells for interference the purpose of interference mitigation. In this way, direct interfaces (such as the X2-interface) among cells in the network are not required because each cell is able to autonomously perform a power allocation strategy of its own. In other words, each individual cell is able to adapt its own power to a desired level without the need for external communication. This feature of the disclosure is particularly beneficial in a heterogeneous network (HetNet) since the downlink power of each cell in the heterogeneous network would adapt itself to the desired level. In this way, the need for complex planning of network deployments is eliminated.

In summary, the present disclosure provides a method for adjusting the downlink transmit power of networks (for example, LTE networks) in an intelligent way, which does not require dedicated interfaces among basestations of the network for interference mitigation purposes, and which significantly reduces power consumption. This reduces costs while providing improved coverage at the edge of cells in the network, thereby enhancing the satisfaction of users at the edge of cells and increasing the cell range. The present disclosure achieves energy saving at the same time as improving performance at the edge of cells in an autonomous way without the need for any exchange of information among basestations.

The present disclosure is compatible with schemes where communication links exist between peer nodes as well as between nodes of different layers. It is also compatible with schemes operated at a different time scale, and in agreement with the theory surrounding the coexistence of multi-layer SON operations.

According to a first aspect of the present disclosure, there is provided a method for controlling a power allocation in a base station of a cell in a cellular communications network across a plurality of sub-bands, the method comprising the steps of:
determining whether a long-term performance achieved by the cell exceeds a first threshold value; and
allocating a total transmit power across the sub-bands according to whether the long-term performance achieved by the cell exceeds the first threshold value.

According to a second aspect of the disclosure, there is provided a basestation configured to operate in accordance with the method of the first aspect of the disclosure.

BRIEF DESCRIPTION OF THE DRAWINGS

For a better understanding of the present disclosure, and to show how it may be put into effect, reference will now be made, by way of example, to the accompanying drawings, in which.

DETAILED DESCRIPTION OF EXAMPLE EMBODIMENTS

Figure 1:
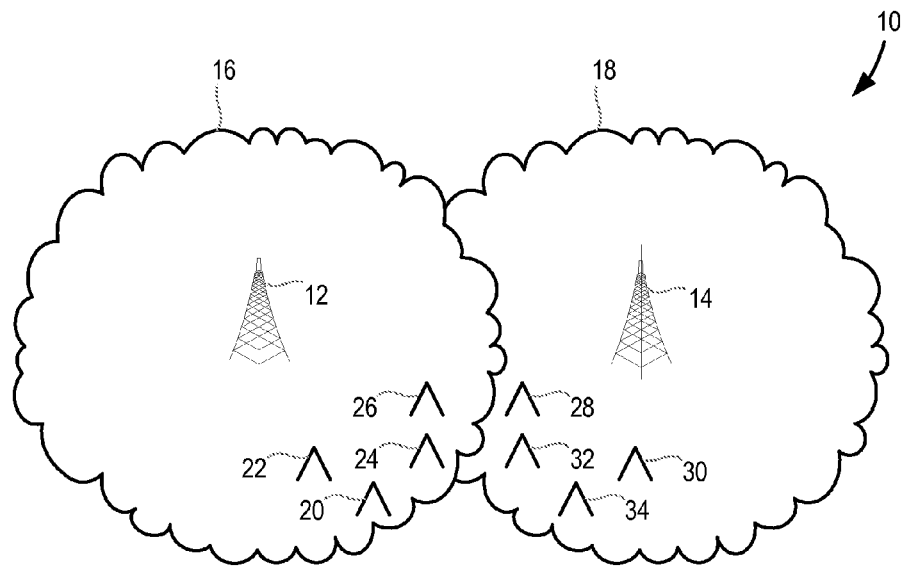
FIG. 1 shows a part of a cellular communications network.

FIG. 1 shows a part of a cellular communication network 10, operating in accordance with the disclosure. The network 10 includes macrolayer base stations, or enhanced Node B's (eNBs), 12, 14, serving respective cells 16, 18, it being appreciated that there is a region of overlap between the two cells 16, 18, in which a user equipment device would be able to establish a connection with either of the base stations 12, 14.

Located within the cells 16, 18 are a number of femtocell base stations, or Home enhanced Node B's (HeNBs), 20, 22, 24, 26, 28, 30, 32, 34, each serving a respective cell in its immediate vicinity. As is well known, there may be tens, hundreds, or even thousands of femtocells within one macrocell. FIG. 1 shows only a small number of such femtocells for the purposes of clarity. For example, the femtocells might be individually owned by customers of the cellular network, or they might be under the common management of the premises in which they are located, such as a shopping mall, university campus, office park or large office building.

A bearer is established between a HeNB and a UE for the transmission of data packets. A bearer is an Internet Protocol (IP) packet flow with a defined quality of service (QoS).

Figure 2:
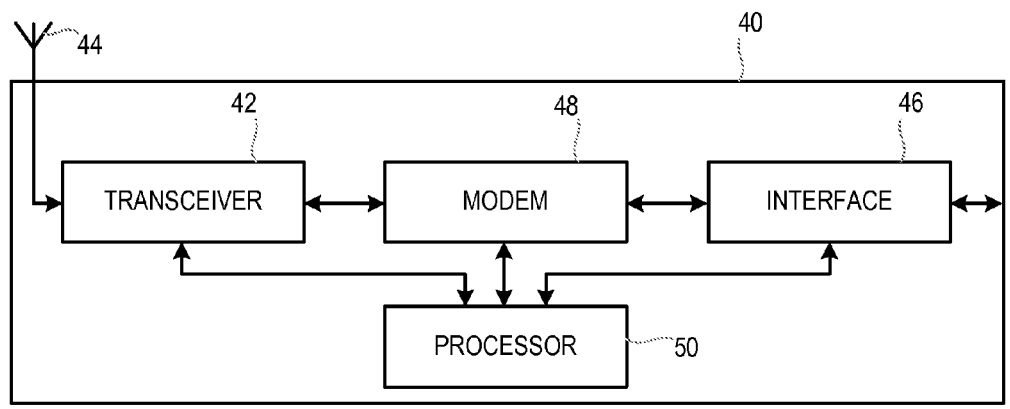
FIG. 2 shows the form of a base station in the network of FIG. 1.

FIG. 2 shows in more detail the form of one of the base stations in the network. The base station 40 shown in FIG. 1 might be a macrolayer base station or a femtocell base station.

The base station 40 has transceiver circuitry 42, for converting signals to and from the formats required for transmission over the air interface. For example, the base station may be intended to form part of an LTE network, and the transceiver circuitry would therefore convert the signals to and from the formats required for this. An antenna 44 is connected to the transceiver circuitry 42.

The base station also has interface circuitry 46, for connection to the rest of the network. Where the base station 40 is a femtocell base station, the interface circuitry 46 might for example be suitable for converting signals to and from the formats required for transmission over a broadband internet connection. Where the base station 40 is a macrolayer base station, the interface circuitry 46 might for example be suitable for converting signals to and from the formats required for transmission over a dedicated link to the core network of the cellular communications network.

A modem 48 is connected between the transceiver circuitry 42 and the interface circuitry 46, for processing the signals and extracting relevant data therefrom. The modem 48, the transceiver circuitry 42 and the interface circuitry 46 operate under the control of a processor 50, as described in more detail below.

One of the aspects of the operation of the base station 40 that is controlled by the processor 50 is the control of a power allocation in the base station 40 across a plurality of sub-bands.

We assume that there are K cells, with $k \in \tilde{K} = \{1, 2, \ldots, K\}$, and J sub-bands $j \in \tilde{J} = \{1, 2, \ldots \tilde{J}\}$ in the system. Furthermore, we assume that each sub-band consists of a fixed number of sub-carriers. Also, it is assumed that time is slotted, and that transmissions within each cell are synchronized, so that intra-cell interference is not present. Two generic quantities are particularly relevant to an inter-cell interference coordination scheme for LTE-based systems.

The first one is the concept of utility, which generally quantifies the level of satisfaction of the entity involved. Let U be a global utility function of the system, which is given by:

$$U = \Sigma_k U_k. \qquad (1)$$

It represents the sum of all utility functions among all cells, where $U_k$ is the utility function of cell k, which is given by the sum of the utility $U_{k,i}$ among all users for cell k, i.e. $U_k = \Sigma_i U_{k,i}$. The idea is to find a way (or ways) to improve, or preferably maximize, the global utility function U.

The second quantity is the transmit power. Here, in the context of Orthogonal Frequency Division Multiple Access (OFDMA) systems such as LTE, the transmit power is expected to be frequency dependent. Let $P_{k,j}$ be the power allocated in sub-band j of cell k, and the maximum power cell k can have is $P_k$, i.e. $\Sigma_j P_{k,j} \leq P_k$. The whole problem of inter-cell interference coordination reduces to how $P_{k,j}$, $\forall j$ is allocated for each k in order to improve or maximize U.

In A. L. Stolyar, H. Viswanathan, "*Self-organizing Dynamic Fractional Frequency Reuse for Best-Effort Traffic Through Distributed Inter-cell Coordination*", proceedings of IEEE Infocomm, April 2009, a gradient-based method is proposed, in which the global utility is improved sub-optimally in a distributive fashion. The main idea of the proposed method is as follows:

Let $D_j(m,k) = \partial U_k/\partial P_{m,j}$, i.e. the rate of change of the utility function $U_k$ for cell k, with respect to the transmit power cell m has allocated for sub-band j. The quantity corresponds to the change of the level of satisfaction that a cell m would incur at sub-band j of cell k. For the purpose of discussion, this quantity will also be called the D value for simplicity. Obviously, an increase in $P_{m,j}$ may potentially have negative impact on $U_k$ when k≠m (i.e. cell m is a neighbour cell), as such an increase would give rise to additional interference at sub-band j coming from cell m, and vice versa. On the other hand, when k=m, an increase of power at sub-band j would enhance the signal quality at this particular sub-band, and would have a positive impact on its own utility.

It can be noted that $D_j(m,k)$ is not very useful if it is considered in only one cell at a time. However, when it is exchanged among neighbour cells, it allows the neighbour cells to know the level of impact caused in the other cells when a certain power level is allocated at each sub-band. By receiving $D_j(m,k)$ from the neighbour cells, cell k would then aggregate them for each sub-band j, i.e.

$$D_j(k) = \Sigma_m D_j(k,m), \qquad (2)$$

(where the switch of the indices m and k represents the fact that cell k is now the neighbour cell of each of the neighbour cells m), including the case of k=m.

In other words, $D_j(k)$ corresponds to the aggregate sensitivity of the utility function to all cells due to the perturbation of its own transmit power at sub-band j.

When $D_j(k)<0$, a positive power increment would incur a negative impact on the aggregate satisfaction among all cells, and vice versa. One idea proposed is for cell k to increase the power by selecting a sub-band associated with the largest positive value of $D_j(k)$, and vice versa.

Let $\delta P > 0$ be a fixed parameter, let $P_k = \Sigma_j P_{k,j}$ be the total power currently used, and let $\tilde{P}_k$ be the power limit. In each of $n_p$ time slots, cell k updates the power sequentially as follows:

1. Set $P_{k,j*} = \max(P_{k,j*} - \delta P, 0)$, where j* is the sub-band index, such that $D_{j*}(k)$ is the smallest among all j's, given that $D_j(k)<0$ and $P_{k,j}>0$.
2. If $P_k < \tilde{P}_k$, set $P_{k,j*} = P_{k,j*} + \min(\tilde{P}_k - P_k, \delta P)$, where j* is the sub-band index, such that $D_{j*}(k)$ is the largest among all j's, where $D_j(k)>0$.
3. If $P_k = \tilde{P}_k$, and $\max_j D_j(k)>0$, set $P_{k,j*}P = \max(P_{k,j*} - \delta P, 0)$ and $P_{k,j*} = P_{k,j*} + \min(P_{k,j*}, \delta P)$, where $D_{j*}(k)$ and $D_{j*}(k)$ are the largest and smallest among those j's which are $P_{k,j}>0$ and $D_j(k)<D_{j*}(k)$.

In this illustrated embodiment, the downlink power adjustment algorithm takes account of the quality of service (QoS) experienced by the users.

A common utility function for cell k is typically defined as the sum of the logarithms of the average bit rates over all users within the cell k. This utility function is rooted in economics, and is motivated by the fact that a fixed increase in bit rate is more important for low bit rate than for users who are already enjoying a high bit rate. Another advantage of such a function is that it is smooth and continuously differentiable, thereby simplifying the complexity in computing the utility sensitivity. Despite the above advantages, such a utility function does not readily provide a means to incorporate QoS into the power adjustment mechanism. For example, consider three users served by a base station, having bit rates of 1 Mbps, 2 Mbps, and 3 Mbps respectively. If all three users only require a bit rate of 500 kbps, it may not be efficient to provide more than necessary from the point of view of resource utilization. An unnecessarily high power generates an unnecessary level of interference, which would then have a knock-on effect on the neighbouring cells. In order to maintain a good level of satisfaction, the neighbours would require a higher power, thereby boosting the overall background interference. The reverse is also true: if a base station reduces its power to a level that just meets the user bit rate requirements, the level of interference to its neighbours would reduce. The neighbours, in turn, would require less power to maintain the call quality, thereby emitting lower interference to the original base station. As a result, the original base station, in turn, would then need less power to maintain the call quality. This process continues until the background interference, and, therefore, the transmit powers of all base stations, eventually settles to a lower level.

The implication of the above process is important, as the idea of removing unnecessary power provides a "feedback" mechanism that eventually helps to further reduce the power requirement for a fixed QoS due to the lowering of the overall interference. This lowering of the power requirement translates to an energy saving for the network.

One way to take the QoS into account is to modify the utility function. However, such an approach potentially makes the utility function more complex, and thereby complicates the sensitivity calculation. In this embodiment, we quantify whether a user's expectation is met by a quantity known as the "Happiness Factor", $H_{k,i}$, which is given by:

$$H_{k,i} = \frac{\bar{R}_{k,i}}{\hat{R}_{k,i}} \qquad (3)$$

where:
$\bar{R}_{k,i}$ is the averaged bit rate achieved by user i in cell k, and
$\hat{R}_{k,i}$ is the corresponding bit rate requirement, which can be directly proportional to the guaranteed bit rate (GBR) (for example as discussed in 3GPP TS 36.413, S1 Application Protocol (S1AP), Release 9, v9.5.1) or can be some function of the GBR.

When $H_{k,i}>1$, the user is experiencing a bit rate that exceeds expectation. The opposite is true when $H_{k,i}<1$. Let $H_k^{(n)}$ be the weighted n-th moment of happiness of cell k, i.e.

$$H_k^{(n)} = \frac{1}{N_k} \sum_{i=1}^{N_k} w_{k,i} H_{k,i}^n, \quad (4)$$

where
$N_k$ is the number of users in cell k, and
$w_{k,i}$ is a cell-specific weight for user i in cell k.
This weight can be used to bias the emphasis among users within the cell, and follows the constraint $$\sum_{i=1}^{N_k} w_{k,i} = N_k.$$

As a special case, when $w_{k,1}=w_{k,2}=\ldots=w_{k,N_k}=1$, $\overline{H}_k=H_k^{(1)}$ reduces to a simple arithmetic mean.

Note that $\overline{H}_k=1$ implies that the average happiness for cell k meets the expectation. However, it also implies that some users are below expectation, while some are above expectation. While the average is useful to quantify performance in general, a more refined approach is to provide a conservative margin to the average value such that $$H_k = \overline{H}_k - \lambda_k \hat{H}_k, \quad (5)$$

where $H_k$ is known as the "true" happiness, and $\lambda_k$ is a scaling factor which controls the level of "conservativeness". The quantity $\hat{H}_k$ is the weighted standard deviation of happiness within cell k, and is then given by:

$$\hat{H}_k = \sqrt{H_k^{(2)} - (H_k^{(1)})^2}. \quad (6)$$

Figure 3:
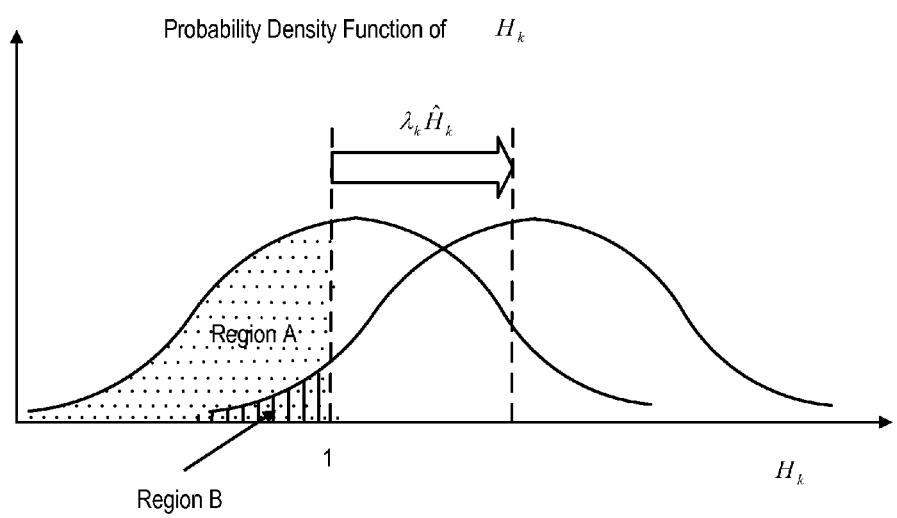
FIG. 3 is a diagram illustrating the effect of considering a happiness factor.

The effect of offsetting the happiness factor in order to increase conservativeness for power adjustment is shown in FIG. 3. FIG. 3 shows the probability density function of $H_k$. With power management operating such that $\overline{H}_k=1$, the area of Region A in FIG. 3 indicates the probability that the true happiness is below unity. By offsetting the happiness factor by $\lambda_k \hat{H}_k$, the probability that the true happiness is below unity reduces from the area of Region A to that of Region B.

Figure 4:
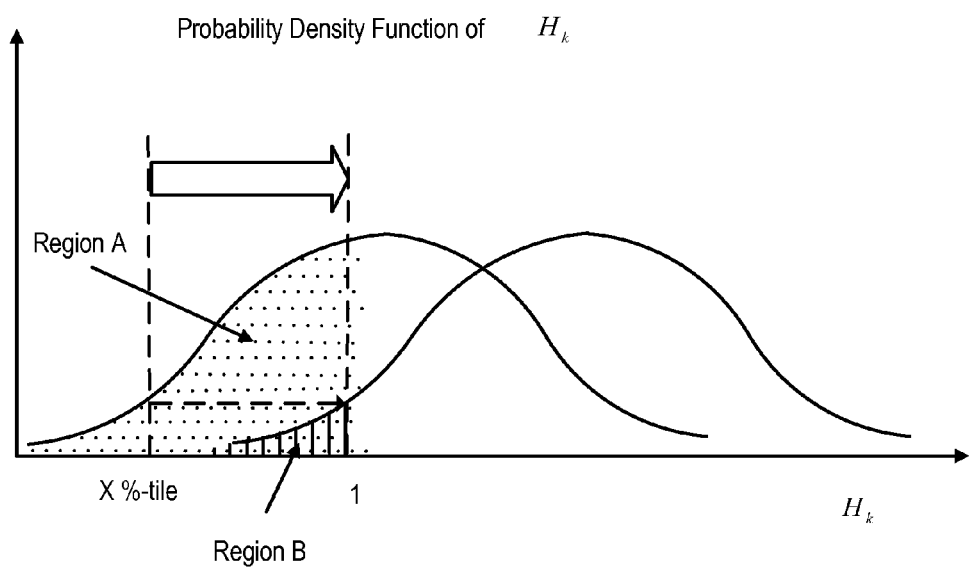
FIG. 4 is a diagram illustrating the effect of considering a modified happiness factor.

FIG. 4 illustrates a more general way to increase conservativeness, by defining $H_k$ as the $X^{th}$ percentile of $H_{k,i}$, $\forall i$. Under this definition, only X % of the happiness would fall below unity as shown in FIG. 4.

Further details on the distributed algorithm based on the above mechanism can be found in "*Distributed Energy-Saving Mechanism for Self-Organizing Femto LTE Networks*", R. Kwan, IEEE Vehicular Technology Conference (VTC) Fall, Quebec, Canada 2012.

Some distributed approaches have been provided that rely on local joint optimization of power, Modulation and Coding Scheme (MCS), and frequency resources. One example of such a distributed approach is described in "*Distributed Resource Allocation for Femtocell Interference Coordination Via Power Minimisation*", by A. Ladanyi et al., Proceedings of IEEE Globecom Workshop, December 2011.

In this example, each cell actively assigns the sub-carriers, power, and MCS jointly in order to minimize the overall cell downlink transmit power, subject to a certain throughput constraint. Although such a scheme allows the cell to assign resources autonomously, it requires frequency UE measurement reports that include the SINR as well as downlink interference power across each frequency resource unit. Following the measurement reports from all UEs within the cell, the eNB attempts to perform a discrete optimization. However, since discrete optimization is typically computationally intensive, the computation cost is high even though the algorithm is faster. Also, the scheme requires that the downlink interference power as well as the SINR across the whole bandwidth is signalled back to the eNB from all UEs. Furthermore, the output of the optimization is not predictable in that the output of one optimization instance may give rise to a different power distribution across the bandwidth compared to the next instance. Such changes in power allocation give rise to rapid changes in the inter-cell interference patterns, which reduce the reliability of the UE measurements.

A similar example of such a distributed approach is described in "*Self-Organization for LTE Enterprise Femtocells*", by G. de la Roche et al., Proceedings of IEEE Globecom Workshop, December 2010. In this example, the main objective is to minimise the total received interference within the cell by allocating the appropriate frequency resource units for all UEs. However, this approach suffers from a similar issue in that the interference experienced by each UE for every frequency resource unit needs to be fed-back to the eNB.

Figure 5:
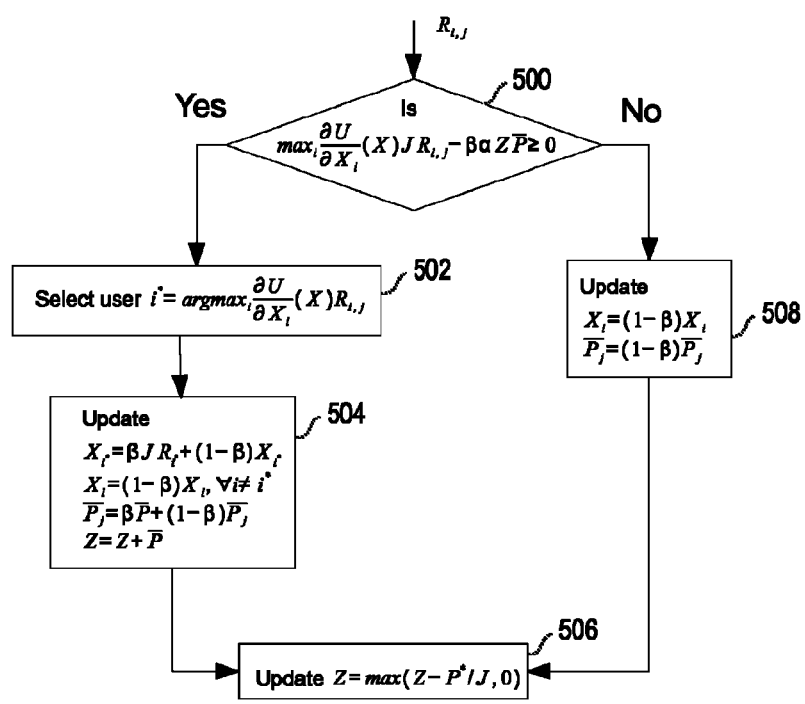
FIG. 5 is a flow chart, illustrating an algorithm for optimizing the power of a basestation.

In the previously mentioned document entitled "*Self-organizing Dynamic Fractional Frequency Reuse for Best-Effort Traffic Through Distributed Inter-cell Coordination*", by A. L. Stolyar, and H. Viswanathan, in proceedings IEEE Infocomm, April 2009, an autonomous algorithm is proposed using a non-trivial heuristics. As the algorithm is autonomous, the cell-specific index k is dropped for the sake of clarity. At the beginning of each power allocation period, the earlier proposed algorithm involves $n_v$ number of iterations. In each iteration, the algorithm sequentially picks a sub-band j and performs the method as shown in FIG. 5. For each iteration the algorithm scans across each sub-band j=1 to J.

The algorithm maintains the "virtual throughput" $X_i$, the value of the power $\overline{P}_j$ specific to a sub-band j for all j, and a variable Z (which is an accumulating parameter). The accumulating parameter Z represents the accumulated sum of a virtual power parameter $\overline{P}$, which is described in more detail below. Typically, a small averaging parameter $\beta$ is chosen in conjunction with n, such that the product of $\beta$ and $n_v$ is constant. The algorithm runs continuously such that the initial values of the parameters $X_i$, $\overline{P}_j$ and Z are not critical. For simplicity, these parameters can be chosen as $$X_i = \sum_j R_{i,j} / N,$$

$\overline{P} = P^*/J$, and Z=0, where $R_{i,j}$ is the bit rate specific to a sub-band j that can be supported by a user i, J is the total number of sub-bands, and $P^*$ is the fixed maximum available power that the cell can provide.

With reference to FIG. 5, the bit rate $R_{i,j}$ specific to a sub-band j that can be supported by a user i and the maximum power $P^*$ that the cell can provide are provided.

Given the bit rate $R_{i,j}$, it is determined whether the maximum value of the product of the partial derivative of the global utility function U of the system with respect to the "virtual throughput" $X_i$ experienced by user i (where U is a function on $X_i$), the total number of sub-bands J and the bit rate $R_{i,j}$ specific to a sub-band j that can be supported by a user i minus the product of the averaging parameter $\beta$, the variable Z, the virtual power parameter $\overline{P}$ and a normalizing factor $\alpha$ is greater than or equal to zero (step 500). In other words, it is determined whether the following condition is met:

$$\max_i \frac{\partial U}{\partial X_i}(X)JR_{i,j} - \beta \alpha Z \overline{P} \geq 0 \quad (7)$$

The quantity $\overline{P}$ is a virtual power parameter such that $P^*/J \leq \overline{P} \leq P^*$. Alternatively, the virtual power parameter $\overline{P}$ can be written as $$\overline{P} = \frac{P^* w}{J},$$

where $1 \leq w \leq J$. If the condition defined in Equation (7) is larger than zero, then the sub-band j is potentially useful to be included for power allocation. Otherwise, the power would be better allocated to other sub-bands. The quantity $\alpha$ is a normalization coefficient that is used to normalize the term $ZP$ such that a better stability can be achieved.

For example, if the power were very small, the initial probability that the condition is true would be much higher than in the case of a much higher power. In addition, as the algorithm does not take into account the unit used, the condition can be true for one type of unit and false for another type of unit. Thus, there is a possibility that the outcome of the check will be random, especially at the beginning of the algorithm. This can lead to an unstable algorithm without a normalization coefficient $\alpha$. As an example of a value of the normalization coefficient $\alpha$, to normalize the second term in the above expression, $\alpha$ could take on a value of $\alpha=1/(P^{*2})$.

If the condition is satisfied (i.e. if the quantity defined in Equation (7) is greater than or equal to zero), it is considered that it would be beneficial to include the sub-band j in the sub-bands to which power is to be allocated. In this case, a user i* is selected such that the quantity $$\frac{\partial U}{\partial X_i}(X)R_{i,j}$$

is the largest (step 502). In other words, a user i* is selected such that:

$$i^* = \operatorname{argmax}_i \frac{\partial U}{\partial X_i}(X)R_{i,j} \quad (8)$$

The variables $X_{i^*}$, $X_i$, $\overline{P}_j$ and $Z$ are then updated for the selected user i* as follows (step 504):

$X_{i^*} = \beta J R_{i^*} + (1-\beta) X_{i^*}$, $X_i = (1-\beta) X_i, \forall i \neq i^*$, $\overline{P}_j = \beta \overline{P} + (1-\beta) \overline{P}_j$, and $Z = Z + \overline{P}. \quad (9)$ For example, as shown in Equation (9), the variable $X_{i^*}$ is updated for the selected user i* by including the estimated rate $JR_{i^*,j}$ in the averaging. The quantity $(1-\beta) X_{i^*}$ is a fraction $(1-\beta)$ taken of the previous value of the "virtual throughput" $X_{i^*}$ experienced by the user i*. For all other users i (i.e. for $\forall i \neq i^*$), the updated average is $X_i = (1-\beta) X_i$. The quantity $(1-\beta) X_i$ is a fraction $(1-\beta)$ taken of a previous value of the "virtual throughput" $X_i$ experienced by another user i. As the virtual power $\overline{P}$ is now allocated to user i*, it is updated as $\overline{P}_j = \beta \overline{P} + (1-\beta) \overline{P}_j$, and the temporary accumulating parameter Z is updated as $Z = Z + \overline{P}$. The quantity $(1-\beta) \overline{P}_j$ is a fraction $(1-\beta)$ taken of a previous value of the virtual power $\overline{P}_j$ specific to sub-band j.

Finally, the accumulating parameter Z is updated as follows (step 506):

$Z = \max(Z - P^*/J, 0)$

If, on the other hand, it is determined in step 500 that the condition defined in Equation (7) is not satisfied (i.e. if the quantity defined in Equation (7) is less than zero), it is considered that it would be not be beneficial to include the sub-band j in the sub-bands to which power is to be allocated. Thus, in this case, no current value is included in the averaging for both bit rate and power. In other words, the variables $X_i$ and $\overline{P}_j$ are updated as follows (step 508):

$X_i = (1-\beta) X_i$, and $\overline{P}_j = (1-\beta) \overline{P}_j$.

As before, the accumulating parameter Z is updated as follows (step 506):

$Z = \max(Z - P^*/J, 0)$.

In other words, the accumulating parameter Z is updated irrespective of whether the condition defined in Equation (7) is satisfied.

The output of the algorithm is the sub-band-specific power allocation $P_j = \overline{P}_j, \forall j$ A more elaborate algorithm is proposed in "*Greedy primal-dual algorithm for dynamic resource allocation in complex networks*", by A. L. Stolyar, Queuing System, 2006.

It should be noted that the autonomous algorithm proposed in "*Self-organizing Dynamic Fractional Frequency Reuse for Best-Effort Traffic Through Distributed Inter-cell Coordination*", by A. L. Stolyar, and H. Viswanathan, in proceedings IEEE Infocomm, April 2009, does not adjust the power directly based on Quality of Service (QoS) requirements or directly in response to the level of QoS experienced by users. However, it is possible to incorporate the QoS requirements in the utility function.

A summary of the algorithm in accordance with the disclosure will now be described with reference to FIG. 6.

Figure 6:
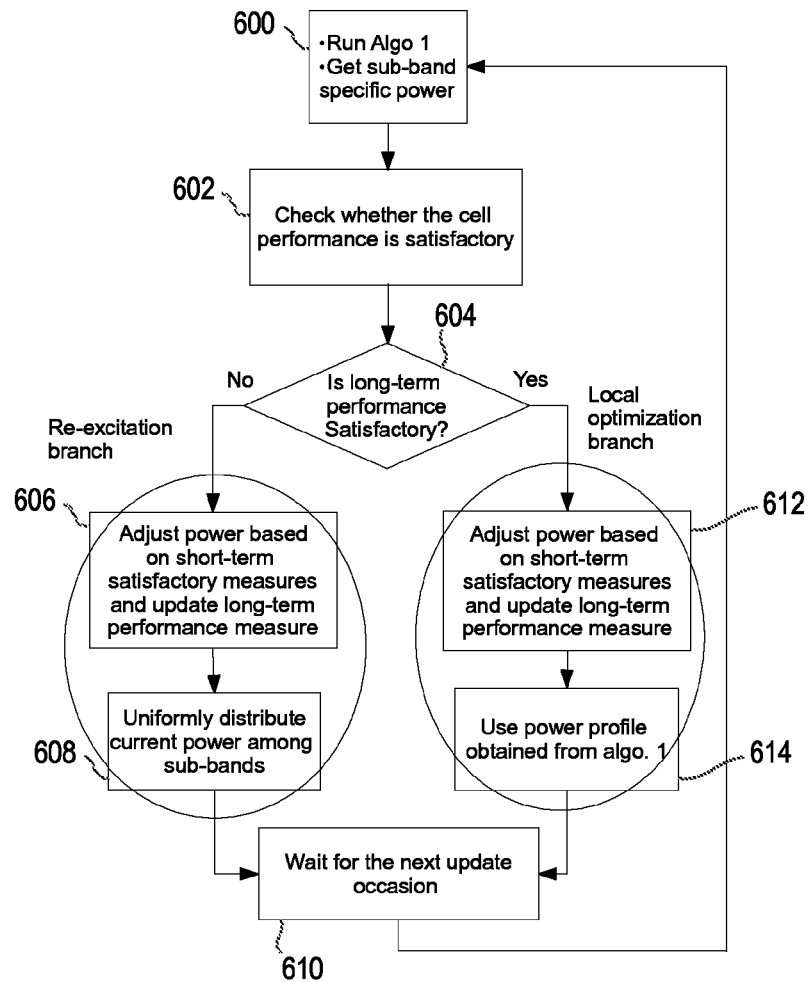
FIG. 6 is a flow chart, illustrating a method for controlling a power allocation in a base station in accordance with the disclosure.

With reference to FIG. 6, the autonomous algorithm of FIG. 5 (referred to as "Algo. 1" in the Figures) is run in order to compute the potential transmit power that can be assigned to each sub-band (step 600).

Two counters $N_1$ and $N_2$ are provided, which accumulate events of un-satisfaction and satisfaction respectively over a certain period of time. These accumulated events are representative of a long-term performance measure of the cell. From these accumulated events, it is determined whether a long-term performance achieved by the cell is satisfactory (step 602). For example, it is determined whether the long-term performance achieved by the cell exceeds a first threshold value.

The long-term performance measure of the cell can be based on the true happiness $H_k$ of the cell that is defined in Equation (5), where the happiness specific to a user is defined in Equation (3). Alternatively, the long-term performance measure of the cell can be based on a percentile of happiness, as described with reference to FIG. 4.

As another alternative, the long-term performance measure of the cell can be calculated as:

$$\theta_k = \frac{1}{L}\sum_{l=1}^{L}\frac{w_l}{J_l}\sum_{j=1}^{J_l}\frac{\tilde{\tau}_{k,l}^{(j)}}{\bar{\tau}_{k,l}}, \quad (10)$$

where $\bar{\tau}_{k,l}^{(j)}$ is a Packet Data Convergence Protocol (PDCP) packet delay for bearer j within cell k, which belongs to a specific Quality of Service (QoS) class denoted by l, averaged over a period of $\tau_k$ unit of time, $\tau_{k,l}$ is a delay budget for cell k, which belongs to the QoS class l, $J_l$ is the number of bearers belonging to the QoS class l, and L is the number of QoS classes of bearers currently being served. The delay budget $\tilde{\tau}_{k,l}$ is a delay deadline before which a packet is expected to be received by cell k. A smaller value of the delay budget $\tilde{\tau}_{k,l}$ corresponds to a more stringent QoS requirement and vice versa.

The period $\tau_k$ can be set to reflect the level of the long-term performance measure required. Since different QoS classes may have different levels of importance, a class-specific weighting parameter $w_l$ can be introduced to take into account these differences. This weighting parameter is defined by $$\sum_{l=1}^{L} w_l = 1.$$

As yet another alternative, the long-term performance measure of the cell can be calculated as:

$$\theta_k = \frac{1}{L}\sum_{l=1}^{L} w_l T_{k,l}^{(X)}, \quad (11)$$

where $T_{k,l}^{(x)}$ is the X-percentile of the ratio $\tau_{k,l}/\tilde{\tau}_{k,l}$, and $\tau_{k,l}$ is the PDCP delay for cell k, which belongs to the QoS class l, over a period of $\tau_k$.

The long-term performance measure is based on the performance that a user or a bearer in the cell can achieve using the radio resources that have been allocated. Since a bearer may make use of one or multiple sub-bands, the long-term performance measure may correspond to a particular sub-band (for example, where a bearer makes use of only one sub-band) or may correspond to a plurality of sub-bands (for example, where a bearer makes use of multiple sub-bands).

If it is determined that the long-term performance achieved by the cell is less than the first threshold value (i.e. if the statistics accumulated by the two counters do not suggest a good long-term performance), the re-excitation branch is followed at step 604. In the re-excitation branch, it is determined whether a current happiness level is met. In other words, it is determined whether a short-term performance achieved by the cell exceeds a second threshold value.

While the accumulation of the counter values defines the long-term performance measure, the counter values themselves at any given time define the short-term performance measure. The short-term performance measure could, for example, be calculated using Equations (10) and (11) by setting the value of $\tau_k$ to be much shorter than that used for the long-term performance measure. As with the long-term performance measure, the short-term performance measure may be sub-band specific (for example, where a bearer makes use of only one sub-band) or may not be sub-band specific (for example, where a bearer makes use of multiple sub-bands).

If the short term performance level is not met (i.e. if the short-term performance achieved by the cell is less than the second threshold value), the total transmit power to be allocated across the sub-bands in the autonomous algorithm of FIG. 5 in the next scheduling period is increased (step 606). In this way, the performance achieved locally (i.e. the performance experienced by users within the cell) is improved. In addition, the counters $N_1$ and $N_2$ are modified accordingly in order to update the long-term performance measure of the cell (step 606).

If the short term performance level is met (i.e. if the short-term performance achieved by the cell is equal to or more than the second threshold value), the total transmit power to be allocated across the sub-bands in the autonomous algorithm of FIG. 5 in the next scheduling period is decreased (step 606). In addition, the counters $N_1$ and $N_2$ are modified accordingly in order to update the long-term performance measure of the cell (step 606).

By further adapting the total transmit power based on a short-term performance achieved by the cell, it is possible to optimise the total transmit power required to provide a satisfactory short-term performance in order to improve the power efficiency of the cell.

In both cases (i.e. irrespective of whether the short term performance level is met), the total transmit power is distributed across the sub-bands (step 608), as follows:

$$P_j \leftarrow \begin{cases} P_l & \text{if } P_j' < th_1 \\ P_h = \frac{\tilde{P} - |\Omega_l|P_l}{|\Omega_h|} & \text{if } P_j' \geq th_1 \end{cases}, \forall j, \quad (12)$$

where $th_1$ is a third threshold value, $\Omega_l$ defines a set of sub-bands where the power $P_j'$ currently allocated by the algorithm of FIG. 5 is less than the third threshold value $th_1$, and $\Omega_h$ defines a set of sub-bands where the power $P_j'$ currently allocated by the algorithm of FIG. 5 is equal to or above the third threshold value $th_1$. $|\Omega_l|$ and $|\Omega_h|$ correspond to the number of sub-bands in the sets $\Omega_l$ and $\Omega_h$, respectively.

In other words, if the power $P_j'$ currently allocated by the algorithm of FIG. 5 is below the third threshold value $th_1$, then the transmit power $P_j$ to be allocated to a sub-band j is set as a first power $P_l$. Similarly, if the power $P_j'$ currently allocated by the algorithm of FIG. 5 is greater than or equal to the third threshold value $th_1$, the transmit power $P_j$ to be allocated to a sub-band j is set as a second power $P_h$, which is equal to the total transmit power $\tilde{P}$ minus the product of the number of sub-bands $|\Omega_l|$ where the power $P_j'$ currently allocated is less than the third threshold value $th_1$ and the first power $P_l$, divided by the number of sub-bands where the power $P_j'$ currently allocated is equal or above the third threshold value $th_1$. The first power $P_l$ is less than the third threshold value $th_1$ and the second power $P_h$ is greater than the third threshold value $th_1$.

The total transmit power may be distributed in this way when the power profile from the algorithm of FIG. 5 is available. Instead of two power levels, multiple power levels can be incorporated.

Figure 7:
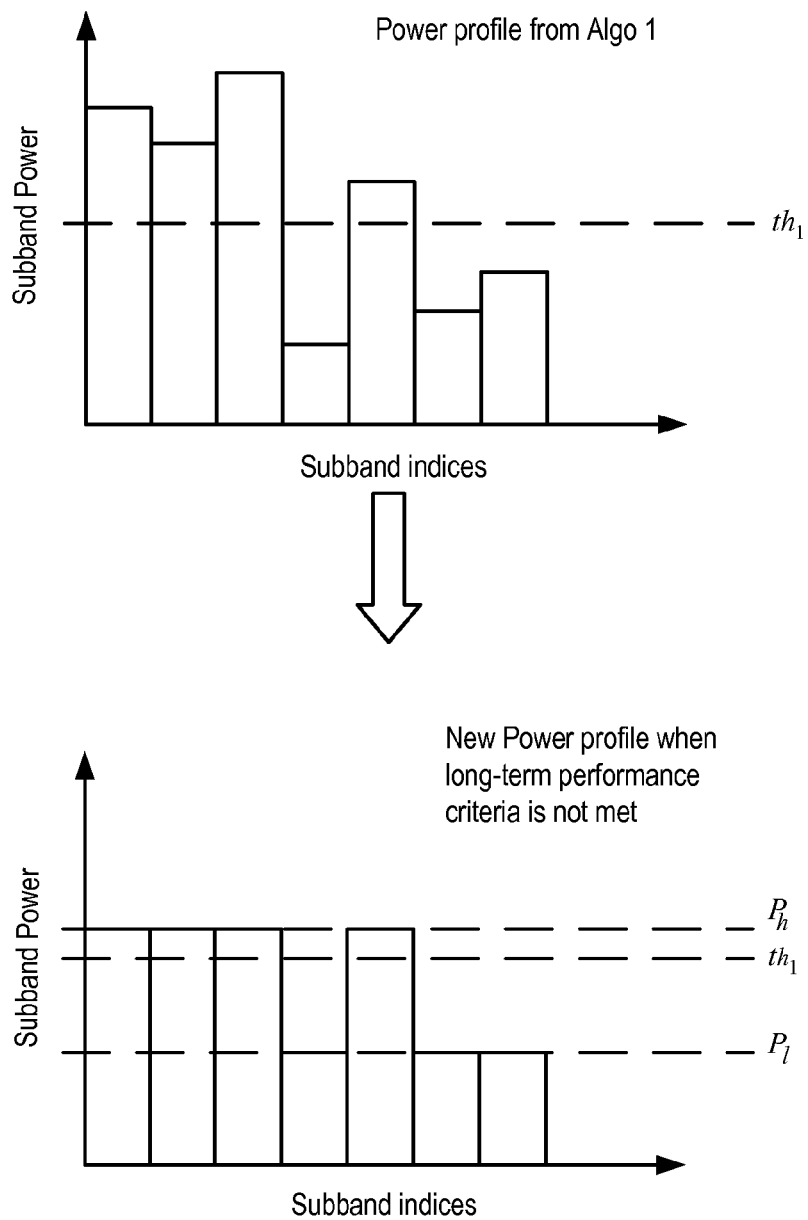
FIG. 7 is a diagram illustrating an example of a power profile produced by the algorithm illustrated in FIG. 5 and an example of an adjusted power profile produced when a certain condition is not met.

FIG. 7 illustrates an example of a power profile produced by the algorithm of FIG. 5 ("Algo 1") and an example of an adjusted power profile produced according to Equation (12) when the long-term performance achieved by the cell is less than the first threshold value. The power profiles show how the total transmit power is distributed across the sub-bands, i.e. the values of power allocated to each sub-band.

As shown in FIG. 7, the power profile produced by the algorithm of FIG. 5 ("Algo 1") could result in a different power being allocated to each sub-band. In contrast, by distributing the total transmit power across the sub-bands according to Equation (12), any sub-band with a current power below the third threshold value $th_1$ will take on the first power $P_l$, and any sub-band with a current power above or equal to the third threshold value $th_1$ will take on the second power $P_h$. This provides a more flexible two-level pattern.

Alternatively, in both cases (i.e. irrespective of whether the short-term performance level is met), the total transmit power is distributed evenly across the sub-bands (step 608). The total transmit power may be distributed in this way when the power profile from the algorithm of FIG. 5 is unavailable.

By distributing the total transmit power evenly across the sub-bands when the long-term performance achieved by the cell is unsatisfactory (i.e. when the long-term performance is less than the first threshold value), it is possible to make use of more frequency resources, at the expense of producing more interference with other cells, in order to improve the performance achieved by the cell.

Even though a uniform power distribution is used, the total transmit power may be adjusted. While the neighbouring cells are using a specific power profile across the sub-bands in order to ensure a good level of orthogonality, the cell with a low long-term performance evenly re-distributes the power across the sub-bands. Such a uniform distribution of power allows the usage of more sub-bands, including those potentially not used by the neighbours. While this can potentially cause an increase in the level of interference experienced by neighbour cells, it can also potentially improve the performance experienced by users in the cell that had a low long-term performance. Once the long-term performance becomes satisfactory, the local optimization can then be invoked.

Following the distribution of the total transmit power across the sub-bands (step 608), the total transmit power for input into the autonomous algorithm of FIG. 5 is updated (step 610) and the process is then repeated in the next scheduling period by again running the algorithm of FIG. 5 (step 600).

If it is determined that the long-term performance achieved by the cell is equal to or more than the first threshold value (i.e. if the statistics accumulated by the two counters suggest a good long-term performance), the local optimization branch is followed at step 604. In the local optimization branch, it is determined whether a current happiness level is met. In other words, it is determined whether a short-term performance achieved by the cell exceeds a second threshold value.

If the short term performance level is not met (i.e. if the short-term performance achieved by the cell is less than the second threshold value), the total transmit power to be allocated across the sub-bands in the autonomous algorithm of FIG. 5 in the next scheduling period is increased (step 612). In this way, the performance achieved locally (i.e. the performance experienced by users within the cell) is improved. In addition, the counters, $N_1$ and $N_2$ are modified accordingly in order to update the long-term performance measure of the cell (step 612).

If the short term performance level is met (i.e. if the short-term performance achieved by the cell is equal to or more than the second threshold value), the total transmit power to be allocated across the sub-bands in the autonomous algorithm of FIG. 5 in the next scheduling period is decreased (step 612). In addition, the counters $N_1$ and $N_2$ are modified accordingly in order to update the long-term performance measure of the cell (step 612).

In both cases (i.e. irrespective of whether the short-term performance level is met), the total transmit power is distributed across the sub-bands based on the results of the autonomous algorithm of FIG. 5 (step 614). This algorithm of FIG. 5 may produce an uneven distribution of transmit power across the sub-bands. In this case, the transmit power is sub-band specific. The algorithm of FIG. 5 is used to "orthogonalise" the transmit powers among basestations of the network so as to avoid interference between basestations as much as possible. For example, where a basestation allocates a high power distribution to a particular sub-band, a neighbouring basestation would allocate a low power distribution to that particular sub-band.

By distributing the total transmit power across the sub-bands according to an algorithm which may produce an uneven distribution of the total transmit power across the sub-bands when the long-term performance achieved by the cell becomes satisfactory (i.e. when the long-term performance is equal to or more than the first threshold value), the same performance can be maintained while the interference with other cells can be reduced.

Following the distribution of the total transmit power across the sub-bands (step 614), the total transmit power for input into the autonomous algorithm of FIG. 5 is updated (step 610) and the process is then repeated in the next scheduling period by again running the algorithm of FIG. 5 (step 600).

As described above, the power to be allocated across the sub-bands in the algorithm of FIG. 5 (i.e. the power that is subsequently input into the algorithm of FIG. 5 in the next scheduling period) is adjusted based on whether the long-term satisfaction and the short-term satisfaction achieved by the cell are satisfactory. This maintains an optimum performance level locally (i.e. an optimum performance level experienced by users within the cell) and thus protects the stability associated with the cell. However, in addition or alternatively, the power could also be increased within the algorithm of FIG. 5 at a sub-band level.

It is noted that the algorithm according to the disclosure could equally be used in combination with alternative algorithms to that of FIG. 5.

Specific examples of the algorithm in accordance with the disclosure will now be described with reference to FIGS. 8 and 9.

Figure 8:
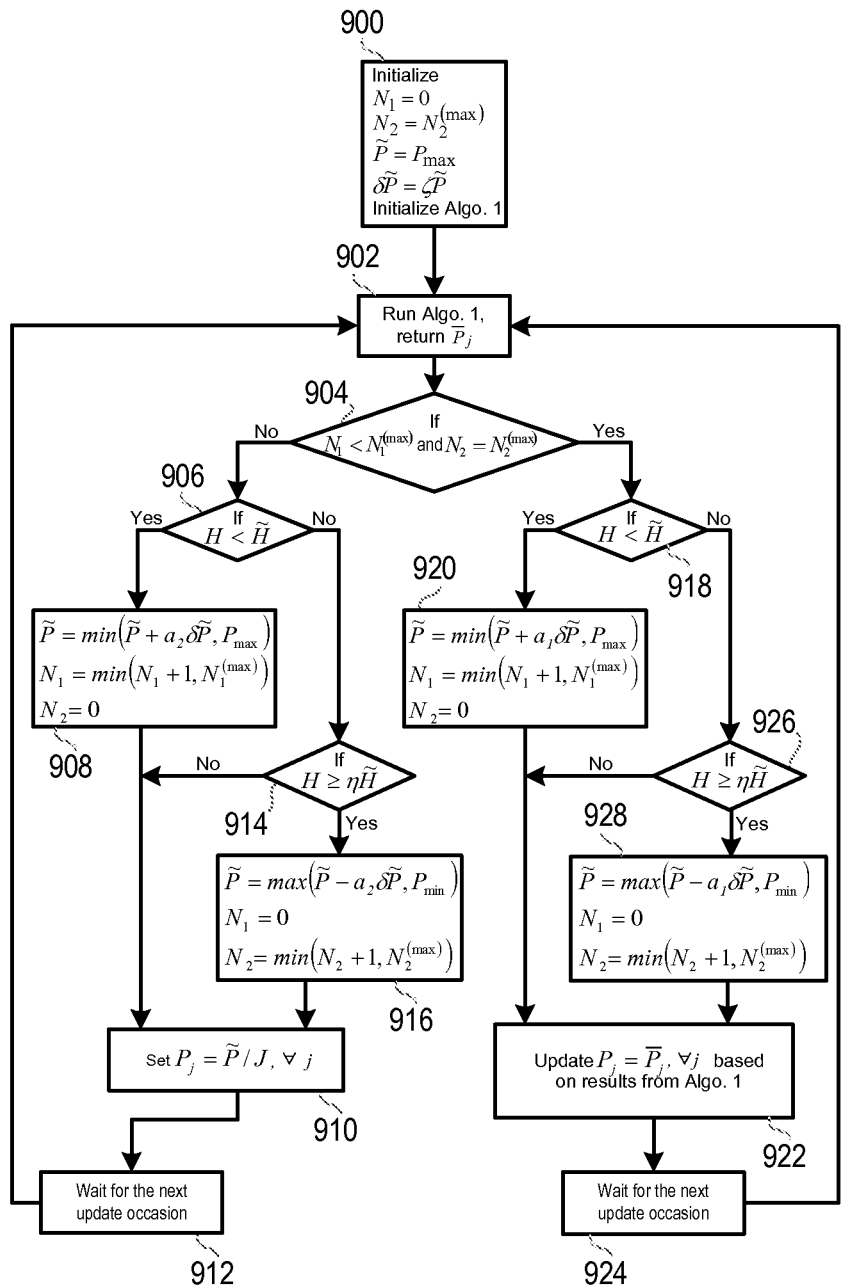
FIG. 8 is a flow chart, illustrating an embodiment of the method for controlling a power allocation in a base station in accordance with the disclosure.

With reference to FIG. 8, the autonomous algorithm of FIG. 5 is initialised and the counters $N_1$ and $N_2$, the total power P to be shared among sub-bands (which is the input to the algorithm of FIG. 5), and the step size $\delta\tilde{P}$ for incrementing or decrementing the total power $\tilde{P}$ are initialised (step 900), as follows:

$$N_1 = 0$$

$$N_2 = N_2^{(max)}$$

$$\tilde{P} = P_{max} \text{ and}$$

$$\delta\tilde{P} = \zeta\tilde{P}.$$

In other words, the counter $N_1$ is set to zero, the counter $N_2$ is set to a maximum value $N_2^{(max)}$, the power $\tilde{P}$ is set to a maximum value, and $\delta\tilde{P}$ is set to $\zeta\tilde{P}$, where $\tilde{P}$ is the total power to be shared among sub-bands and $\zeta$ is a fraction (i.e. a value between 0 and 1). In other words, the step size $\delta\tilde{P}$ is set to a fraction of the total power $\tilde{P}$.

The autonomous algorithm of FIG. 5 is run in order to compute the potential transmit power $\tilde{P}_j$ that can be assigned to each sub-band (step 902).

It is checked whether the value of counter $N_1$ is less than a maximum value $N_1^{(max)}$ and the value of counter $N_2$ is still equal to the initial maximum value $N_2^{(max)}$. In other words, it is checked whether both of the following conditions are met (step 904):

$$N_1 < N_1^{(max)} \text{ and } N_2 = N_2^{(max)}. \quad (13)$$

If one or both of these conditions are not met, it is determined whether the happiness H is less than a predetermined value $\tilde{H}$. In other words, it is determined whether the condition $H < \tilde{H}$ is met (step 906).

If this condition is met, the total transmit power $\tilde{P}$ and the counters $N_1$ and $N_2$ are adapted (step 908) as follows:

$$\tilde{P} = \min(\tilde{P} + a_2 \delta \tilde{P}, P_{max})$$

$$N_1 = \min(N_1 + 1, N_1^{(max)})$$

$$N_2 = 0$$

In other words, the total transmit power $\tilde{P}$ is increased by an amount $a_2 \delta \tilde{P}$ (limited by a maximum power $P_{max}$), the counter $N_1$ is incremented by one (limited by the maximum count $N_1^{(max)}$), and the counter $N_2$ is reset to zero. Here, $a_2$ is a variable that scales the step size $\delta \tilde{P}$ to be used for the power adjustment.

The total transmit power to be allocated to a sub-band j is then calculated by dividing the total transmit power by the total number of sub-bands J (i.e. by setting $P_j = \tilde{P}/J$) and the total transmit power is distributed accordingly (step 910). In this way, the total transmit power is distributed evenly across the sub-bands.

Following the distribution of the total transmit power across the sub-bands (step 910), the algorithm waits for the next occasion to update (step 912) and the process is then repeated in the next scheduling period by again running the algorithm of FIG. 5 (step 902).

If it is determined that the happiness H is not less than the predetermined value $\tilde{H}$, i.e. if the condition $H < \tilde{H}$ is not met, it is determined whether the happiness is greater than or equal to a predetermined value $\eta \tilde{H}$, i.e. it is checked whether the condition $H \geq \eta \tilde{H}$ is met (step 914). The predetermined value $\eta \tilde{H}$ is the product of a hysteresis factor $\eta$ and the predetermined value $\tilde{H}$. The hysteresis factor $\eta$ may, for example, be a value slightly larger than one (such as a value of 1.2, etc.).

If the condition $H \geq \eta \tilde{H}$ is not met, the algorithm waits for the next occasion to update (step 912) and the process is then repeated in the next scheduling period by again running the algorithm of FIG. 5 (step 902).

If the condition $H \geq \eta \tilde{H}$ is met, the total transmit power $\tilde{P}$ and the counters $N_1$ and $N_2$ are adapted (step 916) as follows:

$$\tilde{P} = \max(\tilde{P} - a_2 \delta \tilde{P}, P_{min})$$

$$N_1 = 0$$

$$N_2 = \min(N_2 + 1, N_2^{(max)})$$

In other words, the total transmit power $\tilde{P}$ is decreased by an amount $a_2 \delta \tilde{P}$ (limited by a minimum power $P_{min}$), the counter $N_1$ is reset to zero, and the counter $N_2$ is incremented by one (limited by the maximum count $N_2^{(max)}$).

The total transmit power to be allocated to a sub-band j is then calculated by dividing the total transmit power by the total number of sub-bands J (i.e. by setting $P_j = \tilde{P}/J$) and the total transmit power is distributed accordingly (step 910). In this way, the total transmit power is distributed evenly across the sub-bands.

Following the distribution of the total transmit power across the sub-bands (step 910), the algorithm waits for the next occasion to update (step 912) and the process is then repeated in the next scheduling period by again running the algorithm of FIG. 5 (step 902).

If both of the conditions of Equation (13) are met, it is determined whether the happiness H is less than a predetermined value $\tilde{H}$. In other words, it is determined whether the condition $H < \tilde{H}$ is met (step 918).

If this condition is met, the total transmit power $\tilde{P}$ and the counters $N_1$ and $N_2$ are adapted (step 920) as follows:

$$\tilde{P} = \min(\tilde{P} + a_1 \delta \tilde{P}, P_{max})$$

$$N_1 = \min(N_1 + 1, N_1^{(max)})$$

$$N_2 = 0$$

In other words, the total transmit power $\tilde{P}$ is increased by an amount $a_1 \delta \tilde{P}$ (limited by a maximum power $P_{max}$), the counter $N_1$ is incremented by one (limited by the maximum count $N_1^{(max)}$), and the counter $N_2$ is reset to zero. Here, $a_1$ is a variable that scales the step size $\delta \tilde{P}$ to be used for the power adjustment.

The variables $a_1$ and $a_2$ are constant values that allow the flexibility to adjust the power for the local optimization branch (steps 918 to 924) and the re-excitation branch (steps 906 to 912) respectively at different rates, i.e. to allow the effective step size $\delta \tilde{P}$ used for the power adjustment to be different between the two branches.

The total transmit power to be allocated to sub-band j is then updated by setting $P_j = \tilde{P}_j$ for sub-band j, where $\overline{P}_j$ is the power selected based on the results of the autonomous algorithm of FIG. 5 and the total transmit power is distributed across the sub-bands accordingly (step 922).

Following the distribution of the total transmit power across the sub-bands (step 922), the algorithm waits for the next occasion to update (step 924) and the process is then repeated in the next scheduling period by again running the algorithm of FIG. 5 (step 902).

If it is determined that the happiness H is not less than the predetermined value $\tilde{H}$, i.e. if the condition $H < \tilde{H}$ is not met, it is determined whether the happiness H is greater than or equal to $\eta \tilde{H}$, i.e. it is checked whether the condition $H \geq \eta \tilde{H}$ is met (step 926).

If the condition $H \geq \eta \tilde{H}$ is not met, the algorithm waits for the next occasion to update (step 912) and the process is then repeated in the next scheduling period by again running the algorithm of FIG. 5 (step 902).

If the condition H is met, the total transmit power P and the counters $N_1$ and $N_2$ are adapted (step 928) as follows:

$$\tilde{P} = \max(\tilde{P} - a_1 \delta \tilde{P}, P_{min})$$

$$N_1 = 0$$

$$N_2 = \min(N_2 + 1, N_2^{(max)})$$

In other words, the total transmit power $\tilde{P}$ is decreased by an amount $a_1 \delta \tilde{P}$ (limited by a minimum power $P_{min}$), the counter $N_1$ is reset to zero, and the counter $N_2$ is incremented by one (limited by the maximum count $N_2^{(max)}$).

The total transmit power to be allocated to a sub-band j is then updated by setting $P_j = \overline{P}_j$ for sub-band j, where $\overline{P}_j$ is the power selected based on the results of the autonomous algorithm of FIG. 5 and the total transmit power is distributed across the sub-bands accordingly (step 922).

Following the distribution of the total transmit power across the sub-bands (step 922), the algorithm waits for the next occasion to update (step 924) and the process is then repeated in the next scheduling period by again running the algorithm of FIG. 5 (step 902).

Figure 9:
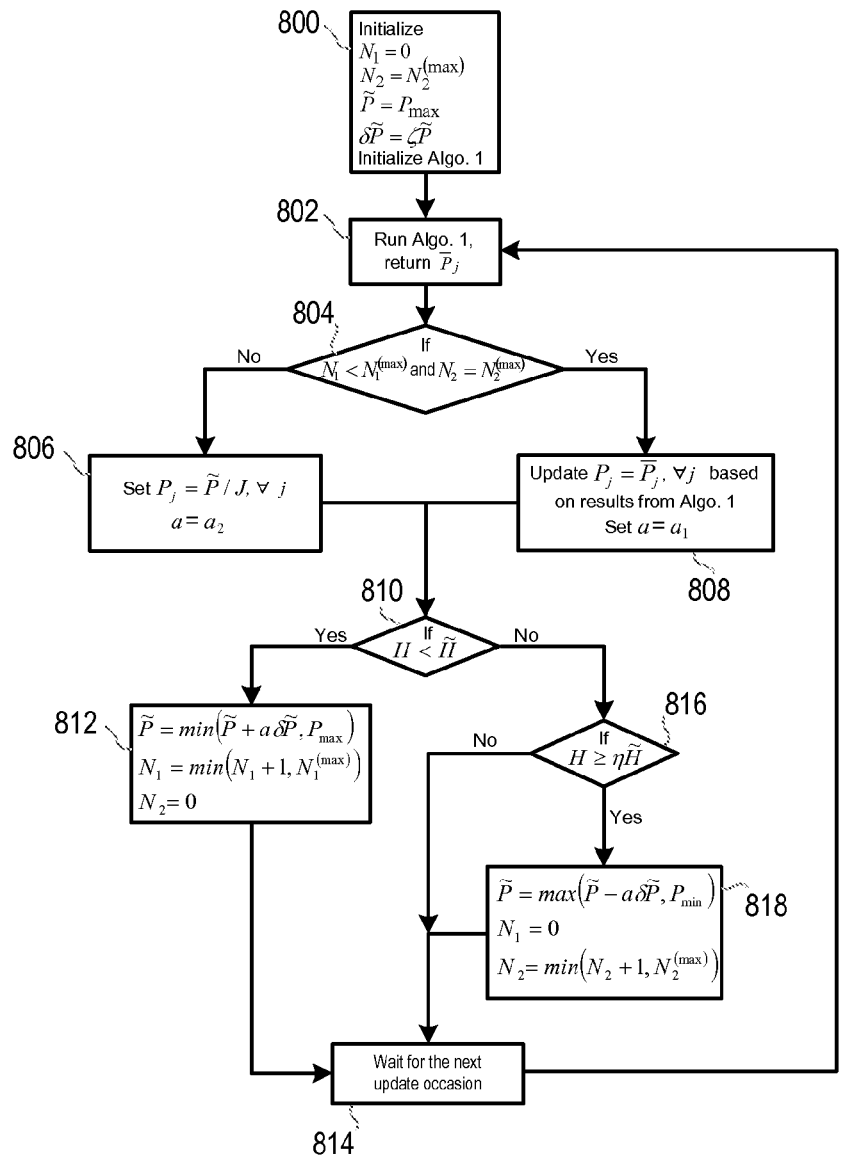
FIG. 9 is a flow chart, illustrating another embodiment of the method for controlling a power allocation in a base station in accordance with the disclosure.

With reference to FIG. 9, another embodiment is provided that is similar to the embodiment shown in FIG. 8. In contrast to the embodiment shown in FIG. 8, the total transmit power $P_j$ to be allocated to sub-band j is set (step 806 or 808) immediately after the long-term performance check is performed (step 804) in the embodiment shown in FIG. 9. Also, depending on which branch (step 806 or 808) is selected based on the result of the long-term performance check (in step 804), the variable a is set accordingly. As before, the variable a scales the effective step size to be used for the power adjustment.

The steps of FIG. 9 will not be described in detail for simplicity since the steps have already been described with reference to FIG. 8.

In the method according to the disclosure, the Quality of Service (QoS) requirement is incorporated directly into the algorithm and it is possible to adjust the downlink power directly based on the current level of happiness achieved. Unlike previous algorithms that are based on the exchange of information among eNBs where the power adjustment is on a per-sub-band basis, the power adjustment according to the disclosure is based on the total power. It should be noted that the power for the pilot channel and other control channels can be excluded, depending on the specific implementation.

In other words, according to the disclosure, the total power $\tilde{P}$ is used as the input to the autonomous algorithm of FIG. 5 instead of a fixed power P* that is used in existing methods. The reason for this is that the adjustment of sub-band specific power would disrupt the integrity of the autonomous algorithm of FIG. 5, and thereby affect the stability of the algorithm. Thus, each power adjustment step according to the disclosure modifies the total power $\tilde{P}$ and allows the autonomous algorithm to compute the sub-band specific power $P_j, \forall j$. This results in a much more stable and usable algorithm.

In addition, existing algorithms attempt to orthogonalise the usage of frequency resources among eNBs in order to reduce or eliminate inter-cell interference by allocating non-overlapping (or quasi-orthogonal if complete orthogonality cannot be achieved) resources among eNBs. However, although this provides a positive impact on cell edge performance, it is important to realise that there is a trade-off between cell edge performance and cell performance. In particular, by orthogonalising frequency resources, inter-cell interference is reduced but at the expense of lower utilization of resources, which would lower the performance that the cell can potentially achieve. This potentially lowers the level of cell-specific happiness.

In contrast, the disclosure combines the benefits of resource orthogonalisation and improves the cell-specific happiness by re-introducing the full reuse when the happiness starts to degrade. At that point, the happiness tends to increase until it reaches a point (with some hysteresis) where the autonomous algorithm is reintroduced. The re-introduction of the autonomous algorithm allows the power adjustment to be performed at a slightly different initial condition, and thereby potentially drives the solution to an improved local optimum. Thus, the disclosure allows the power to continuously improve in the long run.

Figure 10:
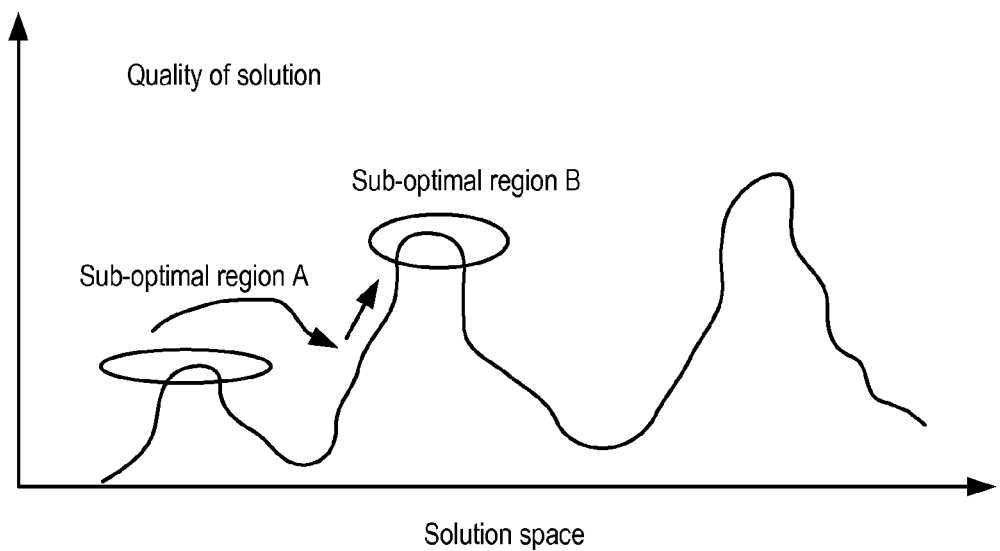
FIG. 10 is a diagram illustrating a result of the effectiveness of the power allocation control method in accordance with the disclosure.

The disclosure can be viewed as a state machine. As described previously, the input to the autonomous algorithm of FIG. 5 is $R_{i,j}, \forall i,j$, which is the bit rate that can be achieved by sub-band j for user i. The output of the algorithm is the sub-band specific power $P_j, \forall j$. It is noted that the power $P_j, \forall j$ may be considered optimal only within a certain region of solution space, i.e. local optimal solution (as shown in FIG. 10).

By introducing the "re-excitation", the bit rates $R_{i,j}, \forall i,j$ are affected due to the change of the power distribution across the sub-bands. This "excitation" may cause the solution to potentially "jump" to a solution space in which a better solution quality can be found (as shown in FIG. 10). The subsequent re-introduction of the autonomous algorithm of FIG. 5 makes use of the new set of bit rates and outputs a potentially better set of power profiles $P_j, \forall j$, as shown in FIG. 10.

FIGS. 11-24 are numerical illustrations that show the benefit of the disclosure performed in a practical scenario.

The scenario is based on a dual-stripe model such as that disclosed in, "*Interference Management in OFDMA Femto-cells*", Small Cell Forum, March 2010. One dual stripe apartment block is included, with four apartments per row, and the femto activation ratio of 1.0 and deployment ratio 1.0 are assumed. There is one HeNB in each activated apartment, which is randomly distributed within the room, with four UEs being served by each HeNB. The 3 km/hr. Pedestrian A channel model is used. The maximum total downlink power is 20 dBm for each HeNB. The value of the weighting parameter w is set to 8.

Figure 11:
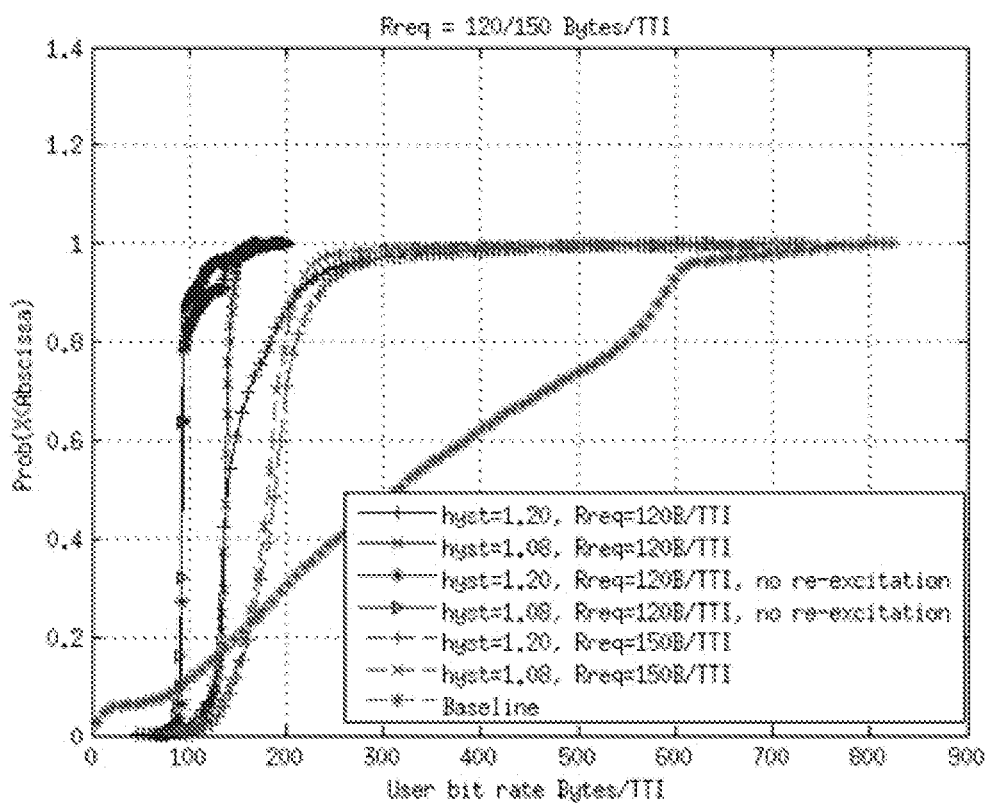
FIG. 11 illustrates a cumulative distribution function (CDF) of a user bit rate for various values of rate requirement and hysteresis parameter q, obtained with and without a re-excitation mechanism.

FIG. 11 illustrates a cumulative distribution function (CDF) of a user bit rate for various values of rate requirement and hysteresis parameter $\eta$, obtained with and without a re-excitation mechanism. In addition, a reference case is included whereby power management is disabled and the total downlink power is fixed and uniformly distributed across the sub-bands. It can be seen that the average user bit rate for the reference case is very good. In this case, only 5% of users achieve approximately 20.0 bytes/TTI, which is significantly below the required bit rate. However, in comparison, even those 5% of users are able to achieve the required bit rate when the algorithm of the disclosure is employed.

The behaviour of the baseline case is expected since full downlink power is used and there is no rate requirement that would limit the bit rate. Thus, users with good channel qualities tend to experience a satisfactory performance.

As no inter-cell coordination is available, the inter-cell interference would have a greater impact on the UEs at the edge of the cells. On the other hand, the average user bit rate is generally lower when the algorithm of the disclosure is employed due to the restriction of the rate requirement. Thus, if the cell is happy, there is no incentive for a cell to maintain a higher transmit power than is necessary.

The sub-band power adjustment of the disclosure enables the power to be adapted in such a way that the power allocation among neighbours is relatively orthogonal among sub-bands. As expected, as the required bit rate decreases, the average user bit rate is reduced correspondingly. More importantly, as can be seen in FIG. 11, the performance improvement of users at the cell edge associated with disclosure is significant relative to those of the reference case. The disclosure prevents unnecessary energy being wasted on more central users that are already experiencing a satisfactory performance at the expense of the users at the cell edge. By redistributing the power appropriately, the performance experienced by users at the cell edge is improved while energy is saved.

Another important observation from FIG. 11 is that the algorithm without the re-excitation mechanism of the disclosure is not able to sustain the required bit rate requirement of 120 bytes/TTI. In comparison, the algorithm of the disclosure is not only able to sustain the required bit rate of 120 bytes/TTI, but is also able to sustain a bit rate of 150 bytes/TTI. This shows that the re-excitation mechanism of the disclosure is able to improve the orthogonalisation of the sub-band power allocation among neighbour cells to thereby reduce inter-cell interference while simultaneously improving the power efficiency.

In addition, from FIG. 11, it can be seen that the hysteresis value q delays the power reduction when the cell-specific happiness is reached. Thus, a larger hysteresis value improves the overall average cell performance at the expense of slightly higher power utilization.

Figure 12:
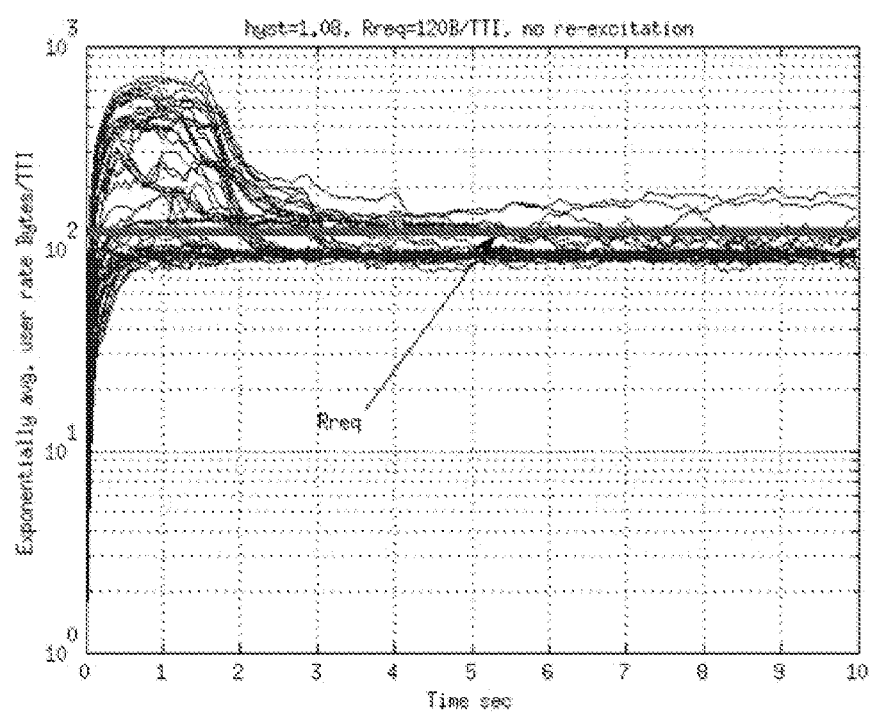
FIG. 12 illustrates a change in user bit rate for a bit rate requirement of 120 Bytes/TTI obtained without a re-excitation mechanism.
Figure 13:
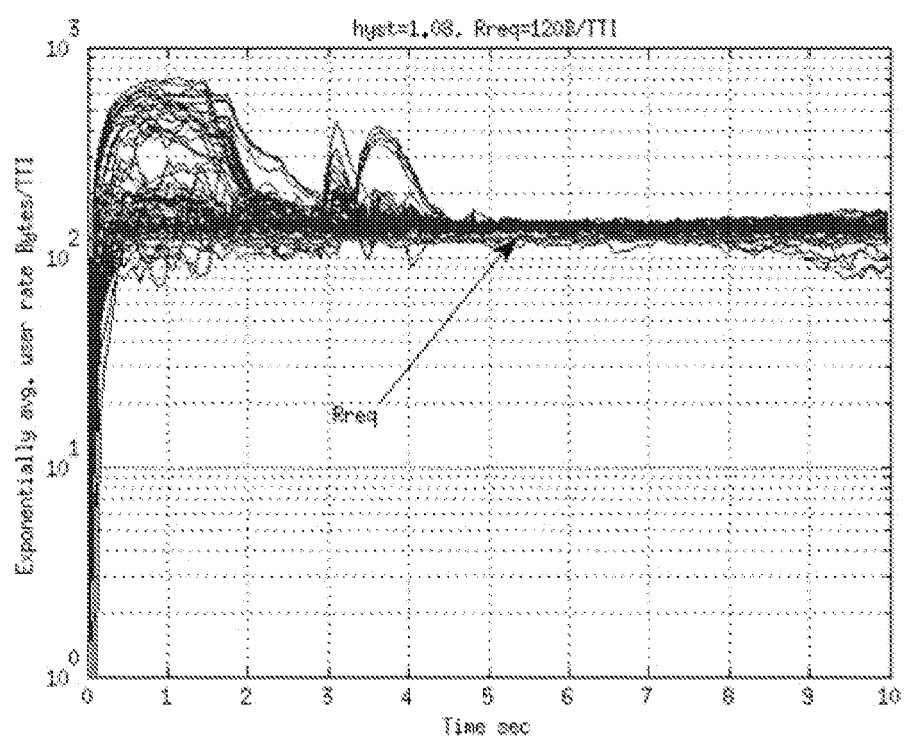
FIG. 13 illustrates a change in user bit rate for a bit rate requirement of 120 Bytes/TTI obtained with a re-excitation mechanism.

FIGS. 12 and 13 illustrate a change in user bit rate for a bit rate requirement of 120 Bytes/TTI obtained with and without the re-excitation mechanism of the disclosure.

In FIG. 12, it can be seen that without the re-excitation mechanism, even the average performance cannot be maintained. This is because the orthogonalisation of power allocation across sub-bands among neighbouring cells is not well optimised. By improving the orthogonalisation of such power allocation (with the re-excitation mechanism), the required bit rate can on average be met, as shown in FIG. 13.

Figure 14:
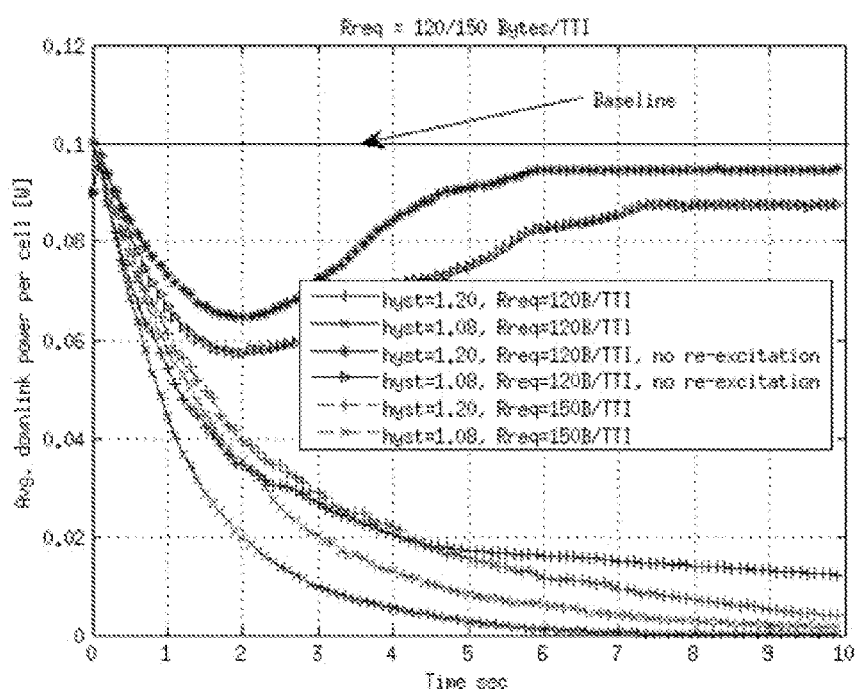
FIG. 14 illustrates a change in average downlink transmit power per Home enhanced Node B (HeNB)

FIG. 14 illustrates a change in average downlink transmit power per Home enhanced Node B (HeNB). As expected, the power associated with the reference case is constant. In comparison, when the algorithm of the disclosure is employed, the power decreases over time. The re-excitation mechanism allows the power optimisation to be carried out opportunistically, and thereby allows power to be adapted depending on the current interference situation. The implication is that a significant power saving is possible. As suggested in FIG. 14, without employing the algorithm of the disclosure, it is not possible to maintain a continuous power reduction at the selected required bit rate. In other words, only a small improvement on power efficiency can be achieved without the presence of the re-excitation mechanism of the disclosure. Again, as expected, a higher value of the hysteresis value $\eta$ improves the overall average cell performance at the expense of slightly higher power utilization.

Figure 15:
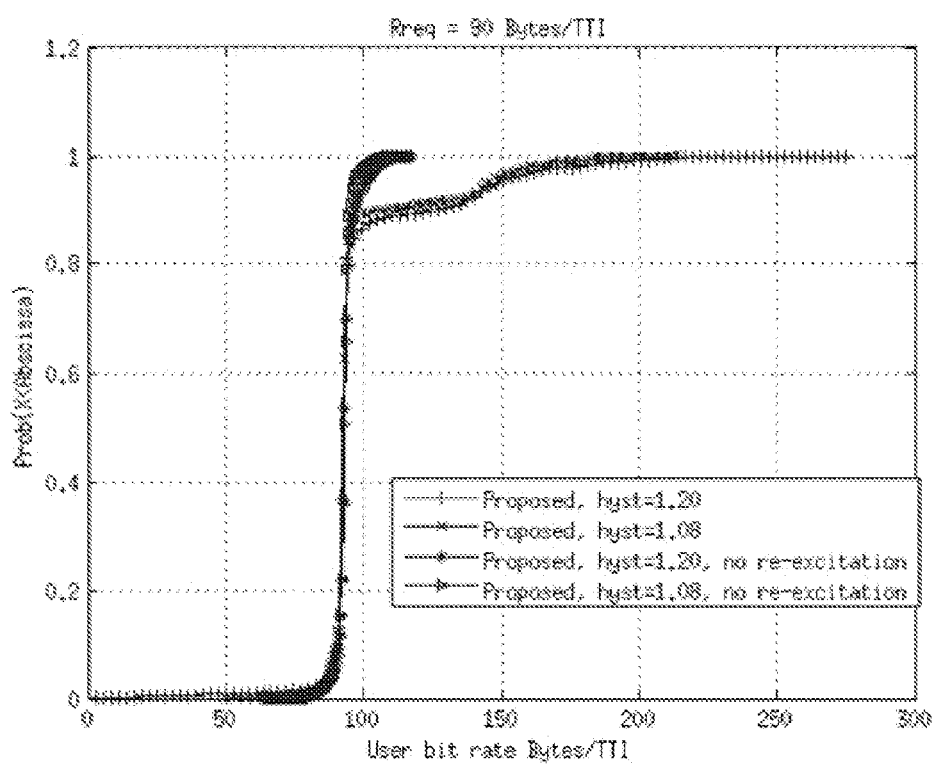
FIG. 15 illustrates a CDF of a user bit rate for various values of hysteresis parameter $\eta$, obtained with and without a re-excitation mechanism, for the case of a smaller rate requirement.

FIG. 15 illustrates a CDF of a user bit rate for various values of hysteresis parameter $\eta$, obtained with and without a re-excitation mechanism, for the case of a smaller rate requirement. As shown in FIG. 15, the algorithm with the re-excitation mechanism of the disclosure provides an improved performance compared to the algorithm without the re-excitation mechanism.

Figure 16:
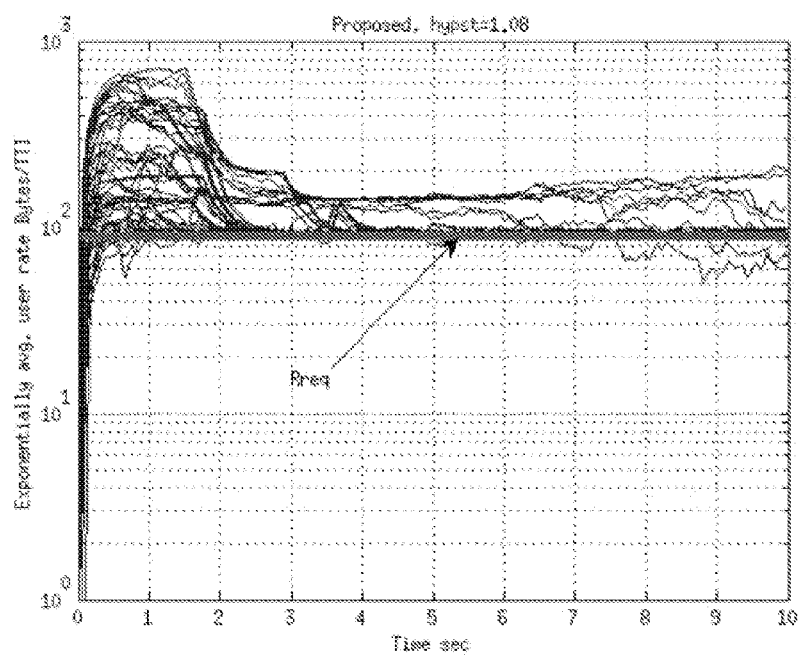
FIG. 16 illustrates a change in user bit rate for the case of the smaller rate requirement with a re-excitation mechanism.
Figure 17:
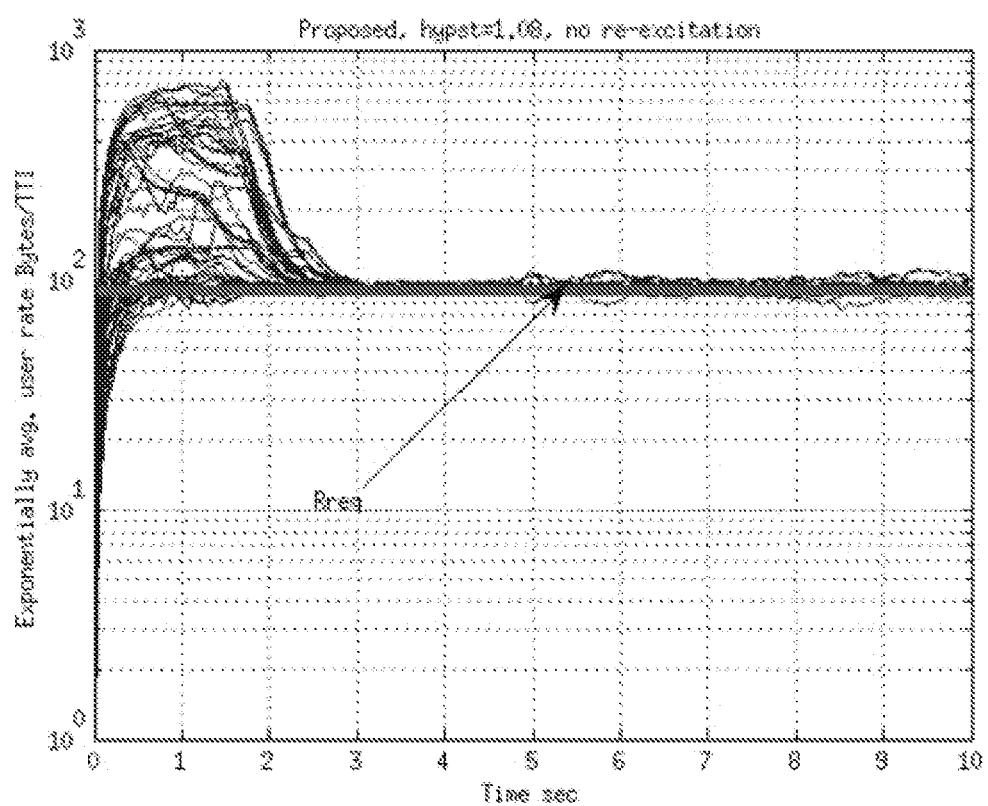
FIG. 17 illustrates a change in user bit rate for the case of the smaller rate requirement without a re-excitation mechanism.

FIGS. 16 and 17 illustrate a change in user bit rate for the case of the smaller rate requirement with and without a re-excitation mechanism respectively. It can be seen in FIGS. 16 and 17 that as long as there is sufficient power resource relative to the required bit rate, the user bit rates provide suitable coverage to the required target. The higher the required bit rate, the more variation there will be in the bit rate. This would result in more effort being required to sufficiently improve the bit rate of users that have the worst bit rate to meet the target bit rate. On the other hand, at a lower required bit rate, less effort would be required to improve the bit rate of those users.

Figure 18:
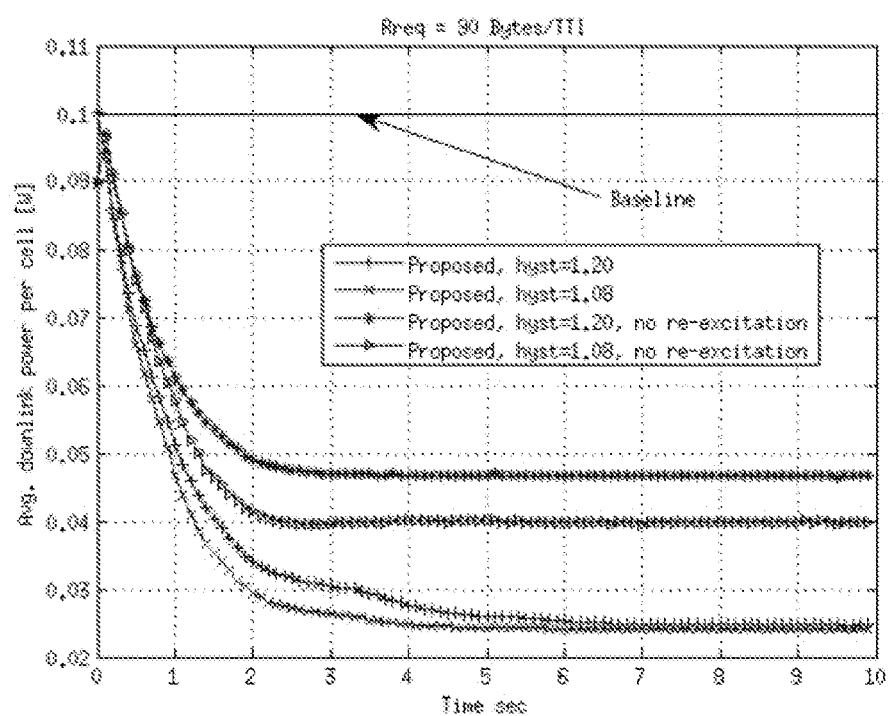
FIG. 18 illustrates a change in average downlink transmit power per Home enhanced Node B (HeNB) for the case of the smaller rate requirement.

FIG. 18 illustrates a change in average downlink transmit power per Home enhanced Node B (HeNB) for the case of the smaller rate requirement for the cases with and without the re-excitation mechanism. It can be seen that although both the algorithm with the re-excitation mechanism and the algorithm without the re-excitation mechanism can maintain the user bit rate to the desired level shown in FIG. 17, the algorithm without the re-excitation mechanism still requires a much higher level of transmit power.

Figure 19:
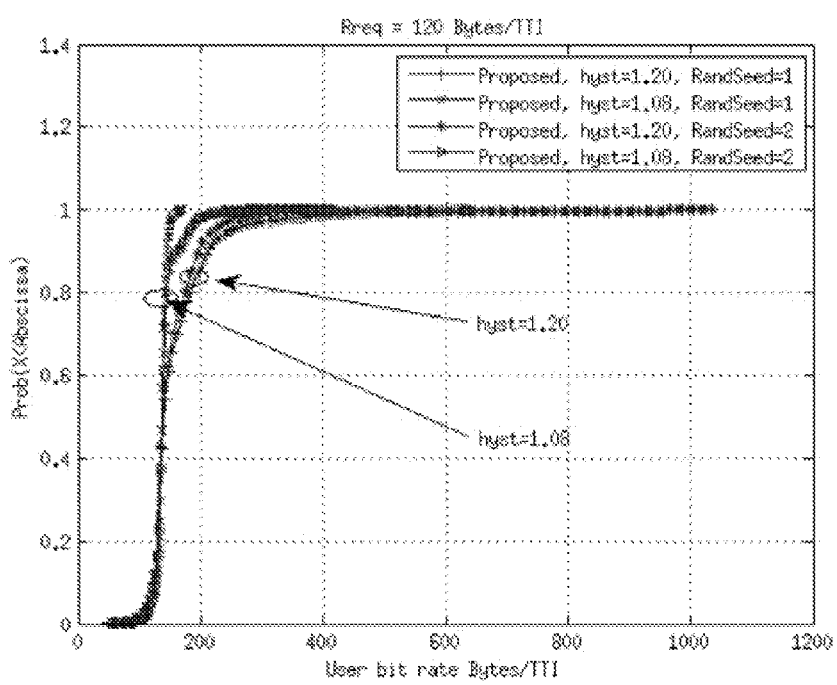
FIG. 19 illustrates a CDF of a user bit rate for various values of hysteresis parameter $\eta$ and a bit rate requirement of 120 Bytes/TTI with two different random seeds.

FIG. 19 illustrates a CDF of a user bit rate for various values of hysteresis parameter $\eta$ and a bit rate requirement of 120 Bytes/TTI with two different random seeds. As expected, some statistical variation occurs at the extreme ends of the bit rates. However, the results suggest that the average performance experienced as a result of the two different seeds are similar.

Figure 20:
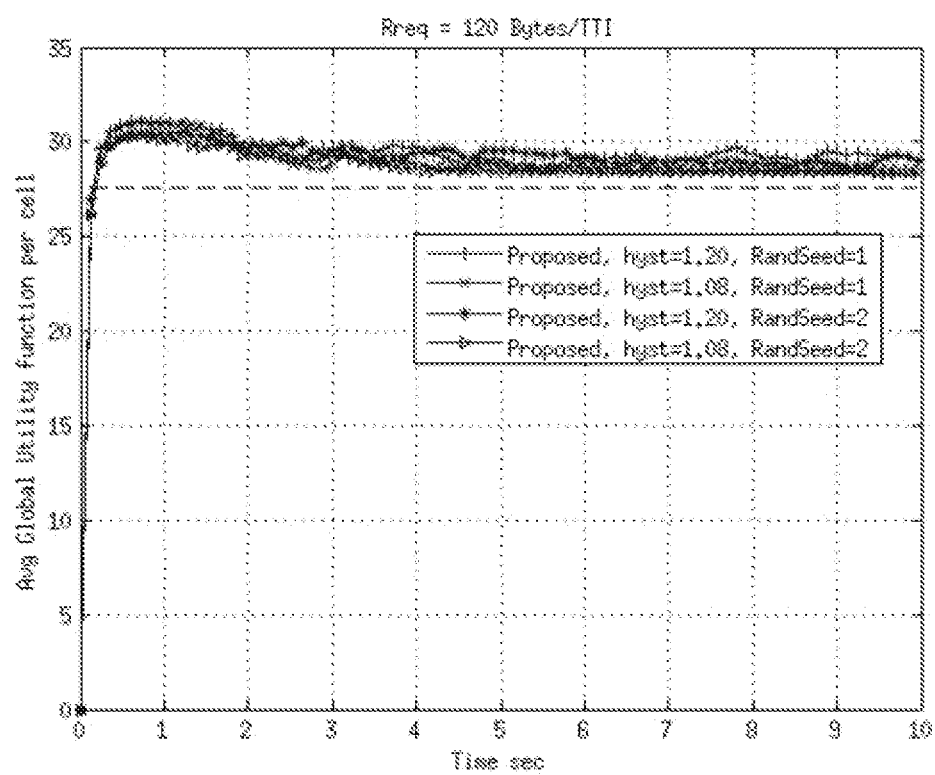
FIG. 20 illustrates a change in user bit rate for various values of hysteresis parameter $\eta$ and a bit rate requirement of 120 Bytes/TTI with two different random seeds.

FIG. 20 illustrates a change in user bit rate for various values of hysteresis parameter $\eta$ and a bit rate requirement of 120 Bytes/TTI with two different random seeds. Again, it can be seen that the dynamics of the algorithm due to the random seeds are similar, and that the statistical fluctuations should not have any impact on the conclusion of the results.

Figure 21:
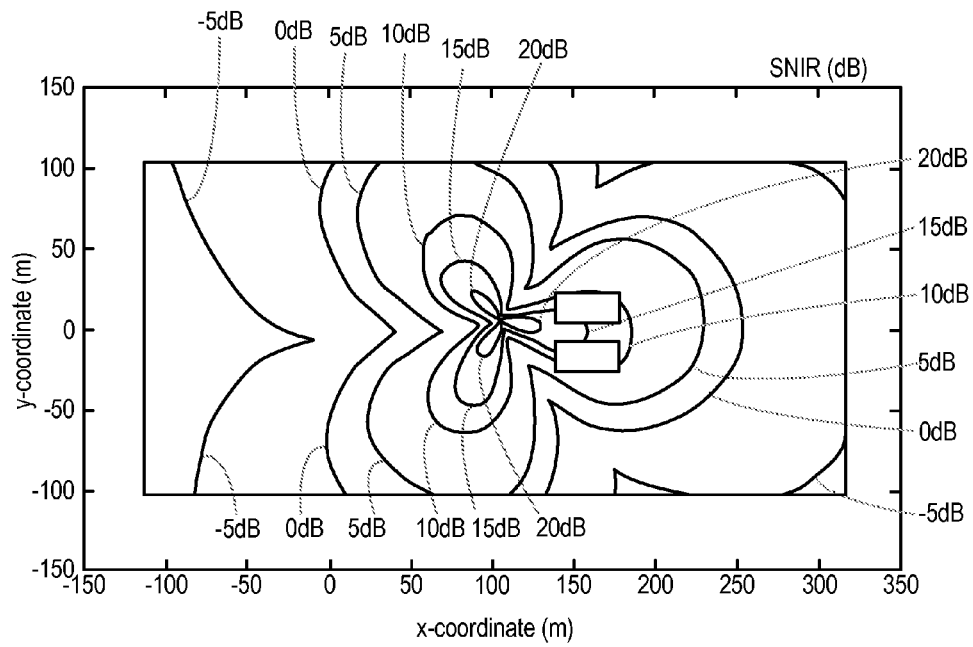
FIG. 21 illustrates the result of a simulation of a femto block placed close to a transmitter of a macrolayer basestation.
Figure 22:
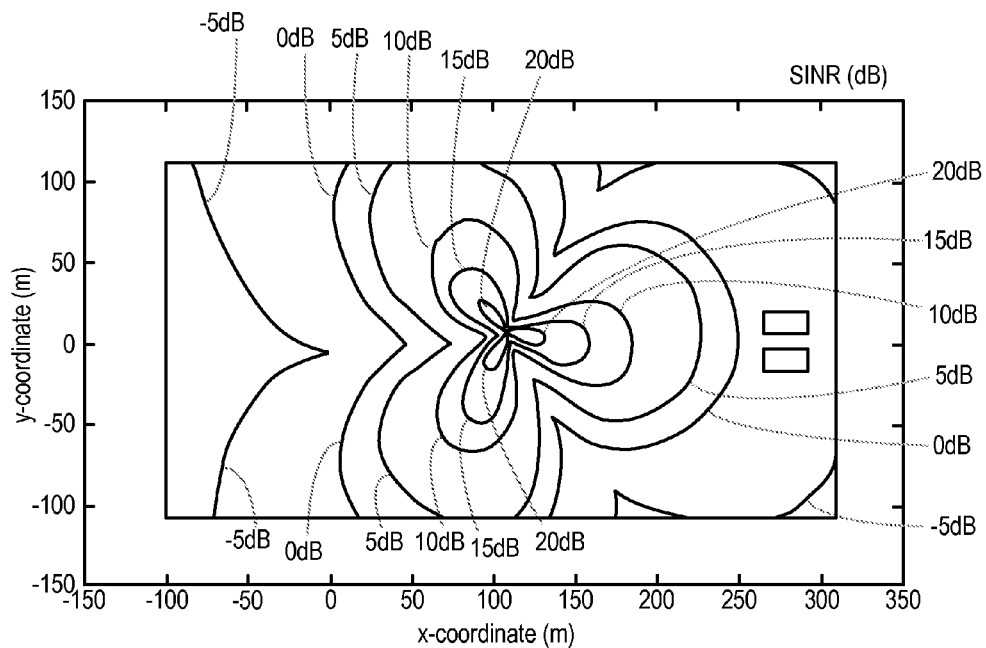
FIG. 22 illustrates the result of a simulation of the femto block placed far away from the transmitter of the macrolayer basestation.

A set of simulation cases have been performed in order to investigate the impact on performance due to the presence of the macro base station. The simulation involves placing the femto block close to a transmitter of a macrolayer basestation (as shown in FIG. 21) and placing the femto block far away from the transmitter of the macrolayer basestation (as shown in FIG. 22). In this simulation, the hysteresis is set to 1.50, the macro antenna model is based on the cosine antenna model with a 3 dB beamwidth of 60 degree, and the transmit power of the macrolayer basestation is 46 dBm.

Figure 23:
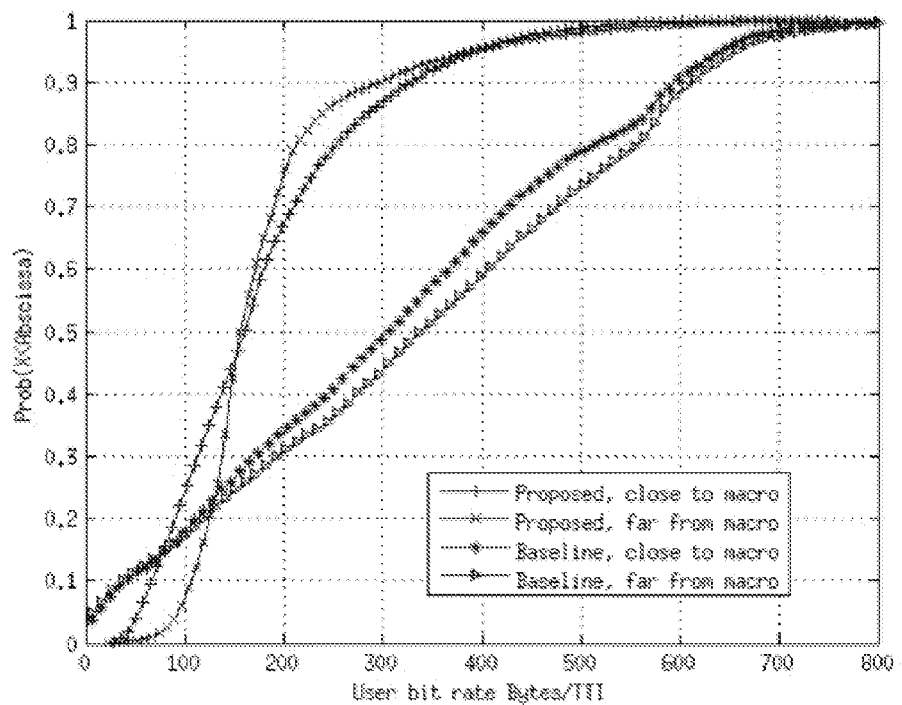
FIG. 23 illustrates a CDF of a user bit rate for a bit rate requirement of 120 Bytes/TTI in the case where the femto block is placed far away from the transmitter of the macrolayer basestation and the case where the femto block is placed close to the transmitter of the macrolayer basestation.

FIG. 23 illustrates a CDF of a user bit rate for a bit rate requirement of 120 Bytes/TTI in the case where the femto block is placed far away from the transmitter of the macrolayer basestation and the case where the femto block is placed close to the transmitter of the macrolayer basestation. It can be seen that, as expected, the user bit rate performance in the case where the femto block is close to macro transmitter is worse than that of the case where the femto block is far from the macro transmitter. However, the average performances between the two cases are very similar. This is expected since the happiness criterion is based on the average cell performance. Of course, if the happiness criterion is based on the X-percentile, then, as long as the resources are available, the X-percentile performance between the two cases should be similar.

It can also be seen that the cell-edge performances for the baseline cases are visibly worse than those of the proposed cases. On the other hand, the difference between average and cell edge performances of the baseline cases is much larger than that of the proposed cases. This observation points to the fact that, in the baseline case, unnecessary energy has been wasted to maintain the unnecessarily high bit rate while the cell edge users are experiencing poor performance. The results suggest that such degraded performance of the edge users and the energy wastage are not necessary even in the presence of a macrolayer basestation, if the proposed algorithm is applied.

Figure 24:
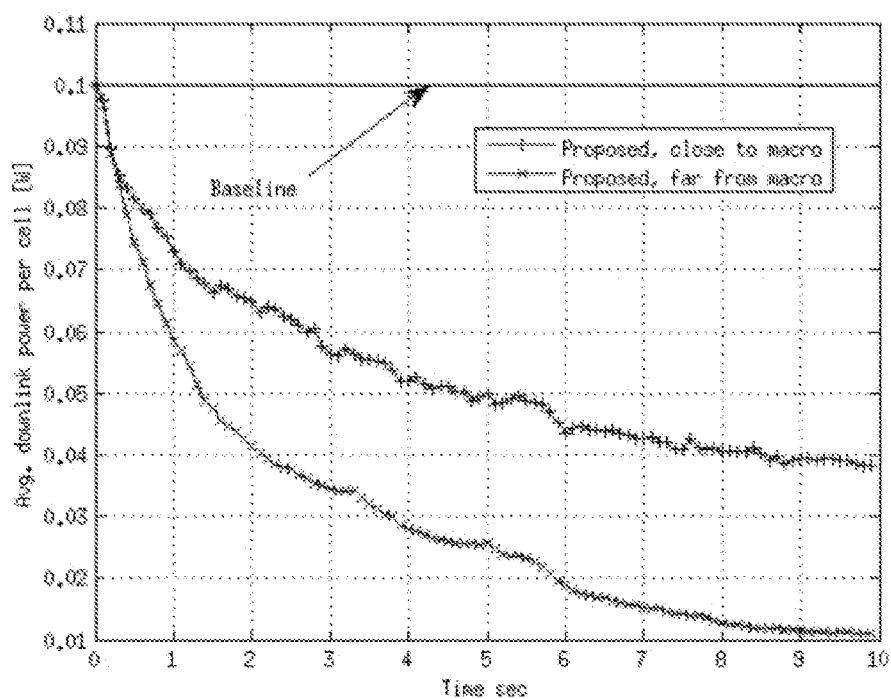
FIG. 24 illustrates a change in average downlink transmit power per Home enhanced Node B (HeNB) for a bit rate requirement of 120 Bytes/TTI in the case where the femto block is placed far away from the transmitter of the macrolayer basestation and the case where the femto block is placed close to the transmitter of the macrolayer basestation.

Finally, FIG. 24 illustrates a change in average downlink transmit power per Home enhanced Node B (HeNB) for a bit rate requirement of 120 Bytes/TTI in the case where the femto block is placed far away from the transmitter of the macrolayer basestation and the case where the femto block is placed close to the transmitter of the macrolayer basestation. Due to the presence of the macrolayer basestation, the performance associated with the femto block that is close to the macrolayer basestation requires more power to maintain the required performance than the case where the femto block is far away. However, the results suggest that even when the femto block is very close to the macrolayer basestation, the increased macro interference does not deter the cell edge performance improvement or the energy saving. Although, a high transmit power is required to overcome the additional interference.

Although the disclosure is described in terms of performing power adaptations among cells autonomously, it is to be understood that the disclosure is also compatible with schemes where communication links between nodes exists. For example, the disclosure could be employed in a deployment scenario with two layers (a macro layer and a small cells layer). In this case, only the nodes in the small cell layer may be using the autonomous algorithm of the disclosure.

Also, the algorithm of the disclosure assumes certain maximum and minimum powers for each cell as inputs. While the cell power across different sub-bands can be adaptively adjusted in order to provide good cell-edge protection and energy saving autonomously, the maximum and minimum powers could also be adjusted much more slowly (for example, depending on the time of the day, the traffic density conditions, etc.).

The disclosure may also be employed with a centralised entity whereby the entity may adjust the power range (i.e. by the adjustment of the maximum and minimum powers) with which each cell can operate. The centralised entity may, for example, employ a high-level algorithm on a global level and the algorithm of the disclosure to perform its local optimization autonomously. Thus, the algorithm of the disclosure is also compatible with a self-organising network mechanism operating at a different time scale.

The disclosure makes use of the QoS requirement to adjust the downlink transmit power in the frequency domain and incorporates the notion of "happiness" in an autonomous algorithm. The "happiness" level of the cell is continuously monitored and the autonomous algorithm is intelligently triggered to provide power adaptation.

The intelligent way in which the algorithm of the disclosure adjusts downlink transmit power of a network significantly reduces power consumption, while still achieving the service requirement, and thereby reduces costs. The algorithm of the disclosure also improves the performance experienced by users at the cell-edge to provide improved cell-edge coverage, and thereby enhances the satisfaction of users at the cell edge and extends the cell range.

Furthermore, the algorithm of the disclosure eliminates the need to establish communication links among neighbour cells for interference purposes. This greatly simplifies the deployment and planning from an interference point of view since the individual cell power would self-adapt to a desired level. This is particularly beneficial in the context of a HetNet. However, the algorithm of the disclosure is also compatible with schemes where communication links between peer nodes, as well as between nodes of different layers, exits. The algorithm of the disclosure is also compatible with schemes operated at a different time scale, and where there coexist multi-layer operations.

The algorithm of the disclosure applies to any technology involving frequency domain power control. In particular, the algorithm of the disclosure applies to LTE.

What is claimed is:

1. A method for controlling a power allocation in a base station of a cell in a cellular communications network across a plurality of sub-bands, the method comprising:
   determining whether a long-term performance achieved by the cell exceeds a first threshold value; and
   allocating a total transmit power across the sub-bands according to whether the long-term performance achieved by the cell exceeds the first threshold value, wherein allocating the total transmit power comprises distributing the total transmit power across the sub-bands according to an algorithm which may produce an uneven distribution of the total transmit power across the sub-bands when the long-term performance achieved by the cell is equal to or more than the first threshold value.

2. A method as claimed in claim 1, wherein the algorithm is adapted to allocate a transmit power to a sub-band based on the frequency of the sub-band.

3. A method as claimed in claim 2, wherein:
   if the long-term performance achieved by the cell is less than the first threshold value, allocating the total transmit power comprises:
      for each sub-band, determining whether a power currently allocated to the sub-band exceeds a second threshold value; and
      distributing the total transmit power across the sub-bands by allocating a power to each sub-band according to whether the power currently allocated to said sub-band exceeds the second threshold value.

4. A method as claimed in 3, wherein:
   if the power currently allocated to a sub-band is greater than or equal to the second threshold value, distributing the total transmit power across the sub-bands comprises:
      allocating a first power to said sub-band.

5. A method as claimed in claim 4, wherein the first power is greater than the second threshold value.

6. A method as claimed in claim 5, wherein:
   if the power currently allocated to a sub-band is less than the second threshold value, distributing the total transmit power across the sub-bands comprises:
      allocating a second power to said sub-band.

7. A method as claimed in claim 6, wherein the second power is less than the second threshold value.

8. A method as claimed in claim 1, wherein:
   if the long-term performance achieved by the cell is less than the first threshold value, allocating the total transmit power comprises:
      distributing the total transmit power evenly across the sub-bands.

9. A method as claimed in claim 1, wherein the long-term performance is determined based on a sum of a Packet Data Convergence Protocol (PDCP) packet delay for each bearer established for the base station per delay budget for the cell.

10. A method as claimed in claim 9, wherein the long-term performance is determined based on the sum of the Packet Data Convergence Protocol (PDCP) packet delay for each bearer established for the base station that meets a certain Quality of Service (QoS) requirement, per delay budget for the cell.

11. A method as claimed in claim 1, wherein the long-term performance is determined based on a sum of a percentile of a Packet Data Convergence Protocol (PDCP) packet delay for each bearer established for the base station per delay budget for the cell.

12. A method as claimed in claim 11, wherein the long-term performance is determined based on the sum of the percentile of the Packet Data Convergence Protocol (PDCP) packet delay for each bearer established for the base station that meets a certain Quality of Service (QoS) requirement, per delay budget for the cell.

13. A method as claimed in claim 12, wherein the sum used to determine the long-term performance is a weighted sum.

14. A method as claimed in claim 1, further comprising:
   determining whether a short-term performance achieved by the cell exceeds a second threshold value; and
   adapting the total transmit power according to whether the short-term performance achieved by the cell exceeds the second threshold value, wherein, if the short-term performance achieved by the cell is equal to or more than the second threshold value, adapting the total transmit power comprises decreasing the total transmit power.

15. A method as claimed in claim 14, wherein, if the short-term performance achieved by the cell is less than the second threshold value, adapting the total transmit power comprises increasing the total transmit power.

16. A method as claimed in claim 15, wherein the short-term performance is determined using a same measure as the long-term performance.

17. A base station configured for power allocation across a plurality of sub-bands, comprising:
a processor to:
   determine whether a long-term performance achieved by a cell of the base station exceeds a first threshold value, and
   allocate a total transmit power across the sub-bands according to whether the long-term performance achieved by the cell exceeds the first threshold value, wherein allocating the total transmit power comprises distributing the total transmit power across the sub-bands according to an algorithm which may produce an uneven distribution of the total transmit power across the sub-bands when the long-term performance achieved by the cell is equal to or more than the first threshold value.

18. A base station as claimed in claim 17, wherein the long-term performance is based on an average happiness of users in the cell or a weighted average happiness of users in the cell.

19. A base station as claimed in claim 17, wherein the long-term performance is based on a standard deviation of a happiness of users in the cell or on a percentile of the happiness of users in the cell.

20. A base station as claimed in claim 17, wherein the long-term performance is based on a ratio of each user's average bit rate to the user's required bit rate.

21. A base station as claimed in claim 17, further comprising a transceiver.

22. A base station as claimed in claim 17, wherein, if the long-term performance achieved by the cell is less than the first threshold value, allocation of the total transmit power comprises distribution of the total transmit power evenly across the sub-bands.

23. One or more non-transitory computer readable media having instructions thereon that, in response to execution by one or more processors of a base station, cause the base station to:
   determine whether a long-term performance achieved by a cell of the base station exceeds a first threshold value; and
   allocate a total transmit power across the sub-bands according to whether the long-term performance achieved by the cell exceeds the first threshold value, wherein allocating the total transmit power comprises distributing the total transmit power across the sub-bands according to an algorithm which may produce an uneven distribution of the total transmit power across the sub-bands when the long-term performance achieved by the cell is equal to or more than the first threshold value.

24. One or more non-transitory computer readable media as claimed in claim 23, having instructions thereon that, in response to execution by one or more processors of a base station, cause the base station to:
   determine whether a short-term performance achieved by the cell exceeds a second threshold value; and
   adapt the total transmit power according to whether the short-term performance achieved by the cell exceeds the second threshold value.

25. One or more non-transitory computer readable media as claimed in claim 23, wherein, if the long-term performance achieved by the cell is less than the first threshold value, allocation of the total transmit power comprises distribution of the total transmit power evenly across the sub-bands.

26. One or more non-transitory computer readable media as claimed in claim 23, wherein the long-term performance measure is sub-band specific.

\* \* \* \* \*